US012441967B2

(12) United States Patent
Tan et al.

(10) Patent No.: US 12,441,967 B2
(45) Date of Patent: Oct. 14, 2025

(54) FLEXIBLE AND DISSOLVABLE SOLID SHEET ARTICLE

(71) Applicant: The Procter & Gamble Company, Cincinnati, OH (US)

(72) Inventors: Hongsing Tan, Beijing (CN); Carl David MacNamara, Beijing (CN); Robert Wayne Glenn, Jr., Liberty Township, OH (US); Ming Tang, Beijing (CN); Toshiyuki Okada, Singapore (SG)

(73) Assignee: The Procter & Gamble Company, Cincinnati, OH (US)

( * ) Notice: Subject to any disclaimer, the term of this patent is extended or adjusted under 35 U.S.C. 154(b) by 615 days.

(21) Appl. No.: 17/368,895

(22) Filed: Jul. 7, 2021

(65) Prior Publication Data

US 2021/0363472 A1 Nov. 25, 2021

Related U.S. Application Data

(63) Continuation of application No. PCT/CN2019/071785, filed on Jan. 15, 2019.

(51) Int. Cl.

| | |
|---|---|
| ***C11D 17/06*** | (2006.01) |
| ***C11D 1/12*** | (2006.01) |
| ***C11D 1/22*** | (2006.01) |
| ***C11D 1/29*** | (2006.01) |
| ***C11D 1/72*** | (2006.01) |
| ***C11D 1/831*** | (2006.01) |
| ***C11D 3/20*** | (2006.01) |
| ***C11D 3/22*** | (2006.01) |
| ***C11D 3/37*** | (2006.01) |
| *C11D 1/14* | (2006.01) |

(52) U.S. Cl.

CPC .............. *C11D 17/06* (2013.01); *C11D 1/831* (2013.01); *C11D 3/2065* (2013.01); *C11D 3/222* (2013.01); *C11D 3/3753* (2013.01); *C11D 1/146* (2013.01); *C11D 1/22* (2013.01); *C11D 1/29* (2013.01); *C11D 1/72* (2013.01)

(58) Field of Classification Search

None

See application file for complete search history.

(56) References Cited

U.S. PATENT DOCUMENTS

| | | | |
|---|---|---|---|
| 3,528,434 A | 9/1970 | Halter et al. | |
| 4,170,565 A | 10/1979 | Flesher et al. | |
| 4,557,852 A | 12/1985 | Schulz et al. | |
| 4,610,799 A | 9/1986 | Wilsberg et al. | |
| 4,654,395 A | 3/1987 | Schulz et al. | |
| 4,699,976 A | 10/1987 | Matsubara et al. | |
| 4,743,394 A | 5/1988 | Kaufmann et al. | |
| 4,747,976 A | 5/1988 | Yang et al. | |
| 4,806,261 A | 2/1989 | Ciallella et al. | |
| 4,938,888 A | 7/1990 | Kiefer et al. | |
| 5,202,045 A | 4/1993 | Karpusiewicz et al. | |
| 5,278,379 A | 1/1994 | Takanashi | |
| 5,393,528 A | 2/1995 | Staab | |
| 6,465,407 B2 | 10/2002 | Hayashi | |
| 6,699,826 B1 | 3/2004 | Saijo | |
| 6,818,606 B1 | 11/2004 | Hanada | |
| 7,094,744 B1 | 8/2006 | Kobayashi | |
| 8,268,764 B2 * | 9/2012 | Glenn, Jr. ................ | A61K 8/11 510/141 |
| 8,367,596 B2 * | 2/2013 | Fossum .................. | C11D 17/00 510/276 |
| 8,425,622 B2 | 4/2013 | Felts et al. | |
| 8,461,090 B2 * | 6/2013 | Glenn, Jr. .............. | A61K 8/463 510/156 |
| 8,461,091 B2 | 6/2013 | Glenn, Jr. et al. | |
| 8,466,099 B2 | 6/2013 | Glenn, Jr. et al. | |
| 8,661,091 B2 * | 2/2014 | Tamiya ................... | G06F 16/93 709/219 |
| 8,765,170 B2 | 7/2014 | Glenn, Jr. et al. | |
| 9,233,055 B2 | 1/2016 | Glenn, Jr. et al. | |
| 10,717,839 B2 | 7/2020 | Mao et al. | |
| 10,752,869 B2 | 8/2020 | Tan et al. | |
| 2002/0091169 A1 | 7/2002 | Klotzer | |
| 2003/0024997 A1 | 2/2003 | Welch | |
| 2004/0071755 A1 | 4/2004 | Fox | |
| 2006/0147493 A1 | 7/2006 | Yang et al. | |
| 2009/0104420 A1 | 4/2009 | Nadella et al. | |
| 2010/0167971 A1 | 7/2010 | Glenn, Jr. et al. | |
| 2010/0173817 A1 | 7/2010 | Glenn, Jr. et al. | |
| 2011/0028374 A1 | 2/2011 | Fossum et al. | |

(Continued)

FOREIGN PATENT DOCUMENTS

| | | |
|---|---|---|
| BR | 112021013072 A2 | 9/2021 |
| CA | 1242949 A | 10/1988 |

(Continued)

OTHER PUBLICATIONS

KR 101787652 B (Year: 2017) with English translation.*

(Continued)

*Primary Examiner* — Lorna M Douyon

(74) *Attorney, Agent, or Firm* — Carolyn S. Powell

(57) ABSTRACT

This provides a flexible and dissolvable solid sheet article containing a PVA polymer or copolymer having a weight average molecular weight of from 50,000 to 400,000 Daltons and a major surfactant selected from the group consisting of $C_6$-$C_{20}$ linear alkylbenzene sulfonates (LAS), alkoxylated sodium trideceth sulfates (STS), and combinations hereof.

16 Claims, 6 Drawing Sheets

(56) References Cited

U.S. PATENT DOCUMENTS

| | | | |
|---|---|---|---|
| 2011/0136719 | A1 | 6/2011 | Jalbert |
| 2011/0189246 | A1 | 8/2011 | Glenn, Jr. et al. |
| 2011/0266717 | A1 | 11/2011 | Nehls et al. |
| 2011/0313072 | A1 | 12/2011 | Maurer et al. |
| 2012/0021022 | A1 | 1/2012 | Hakim |
| 2012/0270029 | A1 | 10/2012 | Glenn, Jr. et al. |
| 2013/0303419 | A1 | 11/2013 | Glenn, Jr. et al. |
| 2014/0105946 | A1 | 4/2014 | Glenn, Jr. et al. |
| 2015/0159330 | A1 | 6/2015 | Weisman et al. |
| 2015/0190476 | A1 | 7/2015 | Schobel et al. |
| 2015/0218497 | A1 | 8/2015 | Jalbert et al. |
| 2015/0315350 | A1 | 11/2015 | Mao et al. |
| 2017/0065512 | A1 | 3/2017 | Zhu et al. |
| 2017/0137591 | A1 | 5/2017 | Mukaiyama et al. |
| 2018/0216052 | A1 | 8/2018 | Denome |
| 2018/0216053 | A1 | 8/2018 | Denome |
| 2018/0223229 | A1 | 8/2018 | Tan et al. |
| 2018/0320669 | A1 | 11/2018 | Stack et al. |
| 2020/0010784 | A1 | 1/2020 | Cho et al. |
| 2020/0308517 | A1 | 10/2020 | Tan et al. |
| 2021/0163698 | A1 | 6/2021 | MacNamara et al. |
| 2021/0332212 | A1 | 10/2021 | Tan et al. |
| 2021/0332312 | A1 | 10/2021 | Tan et al. |
| 2022/0112449 | A1 | 4/2022 | MacNamara et al. |
| 2023/0008032 | A1 | 1/2023 | Tan et al. |

FOREIGN PATENT DOCUMENTS

| | | | |
|---|---|---|---|
| CN | 2226361 | Y | 5/1996 |
| CN | 1202517 | A | 12/1998 |
| CN | 2352536 | Y | 12/1999 |
| CN | 1250085 | A | 4/2000 |
| CN | 1421519 | A | 6/2003 |
| CN | 1583991 | A | 2/2005 |
| CN | 101835459 | A | 9/2010 |
| CN | 102492573 | A | 6/2012 |
| CN | 202744521 | U | 2/2013 |
| CN | 202754982 | U | 2/2013 |
| CN | 102732392 | B | 9/2013 |
| CN | 102965223 | B | 1/2014 |
| CN | 103608448 | A | 2/2014 |
| CN | 103740490 | A | 4/2014 |
| CN | 105199887 | A | 12/2015 |
| CN | 105238584 | A | 1/2016 |
| CN | 105462733 | A | 4/2016 |
| CN | 105586165 | A | 5/2016 |
| CN | 105602773 | A | 5/2016 |
| CN | 105647716 | A | 6/2016 |
| CN | 205398584 | U | 7/2016 |
| CN | 105861168 | A | 8/2016 |
| CN | 105886142 | A | 8/2016 |
| CN | 205420320 | U | 8/2016 |
| CN | 106635572 | A | 5/2017 |
| CN | 106715667 | A | 5/2017 |
| EP | 0234867 | B1 | 1/1993 |
| EP | 0999262 | A1 | 5/2000 |
| JP | S638496 | A | 1/1988 |
| JP | S6312466 | A | 1/1988 |
| JP | S63150396 | A | 6/1988 |
| JP | H04202600 | A | 7/1992 |
| JP | H06308496 | A | 11/1994 |
| JP | H06312466 | A | 11/1994 |
| JP | H06315396 | A | 11/1994 |
| JP | H08132454 | A | 5/1996 |
| JP | H1072599 | A | 3/1998 |
| JP | 2000169896 | A | 6/2000 |
| JP | 2001089797 | A | 4/2001 |
| JP | 2001121638 | A | 5/2001 |
| JP | 2008122043 | A | 5/2008 |
| JP | 4509284 | B2 | 5/2010 |
| KR | 20080111815 | A | 12/2008 |
| KR | 20090036882 | A | 4/2009 |
| KR | 20090036883 | A | 4/2009 |
| KR | 20100090122 | A | 8/2010 |
| KR | 20100096985 | A | 9/2010 |
| KR | 101146292 | B1 | 5/2012 |
| KR | 20120127174 | A | 11/2012 |
| KR | 20120130693 | A | 12/2012 |
| RU | 2267524 | C2 | 1/2006 |
| WO | 2009095891 | A1 | 8/2009 |
| WO | 2009129358 | A2 | 10/2009 |
| WO | 2010077627 | A2 | 7/2010 |
| WO | 2010077628 | A2 | 7/2010 |
| WO | 2010135238 | A1 | 11/2010 |
| WO | 2011014401 | A2 | 2/2011 |
| WO | 2011014643 | A1 | 2/2011 |
| WO | 2012138820 | A1 | 10/2012 |
| WO | 2012157851 | A1 | 11/2012 |
| WO | 2014059252 | A2 | 4/2014 |
| WO | 2018140668 | A1 | 8/2018 |
| WO | 2020072216 | A1 | 4/2020 |
| WO | 2020147005 | A1 | 7/2020 |
| WO | 2022037093 | A1 | 2/2022 |

OTHER PUBLICATIONS

PCT Search Report and Written Opinion for PCT/CN2019/071785 dated Oct. 16, 2019, 12 pages.

All Office Actions; U.S. Appl. No. 17/368,884, filed Jul. 7, 2021.

All Office Actions: U.S. Appl. No. 17/368,893, filed Jul. 7, 2021.

All Office Actions; U.S. Appl. No. 17/368,898, filed Jul. 7, 2021.

Unpublished U.S. Appl. No. 17/368,884, filed Jul. 7, 2021, to Hongsing Tan et al.

Unpublished U.S. Appl. No. 17/368,893, filed Jul. 7, 2021. to Hongsing Tan et al.

Unpublished U.S. Appl. No. 17/368,898, filed Jul. 7, 2021, to Hongsing Tan et al.

PCT Suppl. Search Report and Written Opinion for PCT/CN2019/071785 dated Apr. 1, 2021 ,11 pages.

All Office Actions; U.S. Appl. No. 18/504,425, filed Nov. 8, 2023.

Unpublished U.S. Appl. No. 18/504,425, filed Nov. 8, 2023 to Hongsing Tan et al.

* cited by examiner

FLEXIBLE AND DISSOLVABLE SOLID SHEET ARTICLE

FIELD OF THE INVENTION

The present invention relates to a flexible and dissolvable solid article containing polyvinyl alcohol and one or more surfactants.

BACKGROUND OF THE INVENTION

Flexible and dissolvable detersive sheets comprising surfactant(s) and other active ingredients in a water-soluble polymeric carrier or matrix are well known. Such sheets are particularly useful for delivering surfactants and other active ingredients upon dissolution in water. In comparison with traditional granular or liquid detergents in the same product category, such sheets have better structural integrity, are more concentrated and easier to store, ship/transport, carry, and handle. In comparison with solid tablet detergents in the same product category, such sheets are more flexible and less brittle, with better sensory appeal to the consumers.

One challenge faced by manufacturers of such flexible and dissolvable detersive sheets is that there are only limited surfactants suitable for incorporation into such flexible and dissolvable detersive sheets, due to concerns over the storage stability and film-forming property of the mixture formed by such surfactants and the water-soluble polymeric carrier.

For example, KR101787652 discloses a flexible and dissolvable laundry detergent sheet containing a polyvinyl alcohol polymer or copolymer as the film-former, a non-aromatic $C_8$-$C_{18}$ alkyl sulfate alkali-metal salt without any ethylene oxide group in the structure (such as sodium lauryl sulfate) as the major surfactant, and optionally a nonionic surfactant (such as LA7 or LA9) as the co-surfactant. Specifically, KR10178652 suggests that when other surfactants (such as linear alkylbenzene sulphonate (LAS) or sodium lauryl ether sulfate (SLES)) are used, especially when used as the major surfactant, the associated film-forming performance and storage stability are considerably deteriorated.

Such limited choices of surfactants place a severe constraint on the formulation freedom for such flexible and dissolvable solid sheet products, which in turn may result in detersive products with sub-optimal or less desirable cleaning performance.

There is therefore a need for flexible and dissolvable solid sheet articles containing other surfactants, which provide improved cleaning performance but still maintain good film forming property and storage stability.

It would also be advantageous to provide flexible and dissolvable solid sheet articles with improved dissolution profiles.

It would be further advantageous to provide a more cost-effective and readily scalable process for making the above-mentioned improved flexible and dissolvable sheets.

SUMMARY OF THE INVENTION

In one aspect, the present invention provides a solid article in form of a flexible and dissolvable sheet, which comprises:

i) from about 25% to about 70%, preferably from about 30% to about 65%, more preferably from about 40% to about 60%, by weight of said solid article, of a first surfactant selected from the group consisting of $C_6$-$C_{20}$ linear alkylbenzene sulfonates (LAS), sodium trideceth sulfates (STS) having a weight average degree of alkoxylation ranging from about 0.5 to about 5, and combinations thereof; and ii) from about 5% to about 40%, preferably from about 10% to about 30%, more preferably from about 15% to about 25%, by weight of said solid article, of a second surfactant selected from the group consisting of $C_6$-$C_{20}$ linear or branched alkylalkoxy sulfates (AAS) having a weight average degree of alkoxylation ranging from about 0.5 to about 10, $C_6$-$C_{20}$ linear or branched alkylalkoxylated alcohols (AA) having a weight average degree of alkoxylation ranging from about 5 to about 15, and combinations thereof; and iii) from about 5% to about 50%, preferably from about 10% to about 40%, more preferably from about 15% to about 30%, most preferably from about 20% to about 25%, by weight of said solid article, of a polyvinyl alcohol having a weight average molecular weight of from about 50,000 to about 400,000 Daltons, preferably from about 60,000 to about 300,000 Daltons, more preferably from about 70,000 to about 200,000 Daltons, most preferably from about 80,000 to about 150,000 Daltons.

Preferably, the above-described solid article contains no more than about 20%, preferably from 0% to about 10%, more preferably from 0% to about 5%, most preferably from 0% to about 1%, by weight of said solid article, of non-aromatic and unalkoxylated $C_6$-$C_{20}$ linear or branched alkyl sulfates (AS).

The polyvinyl alcohol used in the present invention is preferably characterized by a degree of hydrolysis ranging from about 40% to 100%, preferably from about 50% to about 95%, more preferably from about 65% to about 92%, most preferably from about 70% to about 90%. More preferably, the solid article of the present invention contains no more than about 20%, preferably from 0% to about 10%, more preferably from 0% to about 5%, most preferably from 0% to about 1%, by weight of said solid article, of starch.

Further, said solid article may comprise from about 0.1% to about 25%, preferably from about 0.5% to about 20%, more preferably from about 1% to about 15%, most preferably from about 2% to about 12%, of a plasticizer by total weight of said sheet. The plasticizer may be selected from the group consisting of glycerin, ethylene glycol, polyethylene glycol, propylene glycol, and combinations thereof. Most preferred plasticizer is glycerin.

In another aspect, the present invention is related to a flexible and dissolvable solid sheet article that comprises: (a) from about 10% to about 25%, by weight of said solid sheet article, of a polyvinyl alcohol having a weight average molecular weight of from about 50,000 to about 400,000 Daltons; and (b) from about 30% to about 80%, by weight of said solid sheet article, of one or more surfactants, which comprise a major surfactant selected from the group consisting of $C_6$-$C_{20}$ linear alkylbenzene sulfonates (LAS), sodium trideceth sulfates (STS) having a weight average degree of alkoxylation ranging from about 0.5 to about 5, and combinations thereof.

Such flexible and dissolvable solid sheet article may further comprise a minor surfactant selected from the group consisting of $C_6$-$C_{20}$ linear or branched alkylalkoxy sulfates (AAS) having a weight average degree of alkoxylation ranging from about 0.5 to about 10, $C_6$-$C_{20}$ linear or branched alkylalkoxylated alcohols (AA) having a weight average degree of alkoxylation ranging from about 5 to about 15, and combinations thereof.

In a particularly preferred embodiment of the present invention, the flexible and dissolvable solid sheet article is porous, and it is characterized by one or more of the following parameters:

- a Percent Open Cell Content of from about 80% to 100%, preferably from about 85% to 100%, more preferably from about 90% to 100%; and/or
- an Overall Average Pore Size of from about 100 μm to about 2000 μm, from about 150 μm to about 1000 μm, preferably from about 200 μm to about 600 μm; and/or
- an Average Cell Wall Thickness of from about 5 μm to about 200 μm, preferably from about 10 μm to about 100 μm, more preferably from about 10 μm to about 80 μm;

and/or

- a final moisture content of from about 0.5% to about 25%, preferably from about 1% to about 20%, more preferably from about 3% to about 10%, by weight of said solid sheet article; and/or
- a thickness of from about 0.5 mm to about 4 mm, preferably from about 0.6 mm to about 3.5 mm, more preferably from about 0.7 mm to about 3 mm, still more preferably from about 0.8 mm to about 2 mm, most preferably from about 1 mm to about 1.5 mm; and/or
- a basis weight of from about 50 grams/$m^2$ to about 250 grams/$m^2$, preferably from about 80 grams/$m^2$ to about 220 grams/$m^2$, more preferably from about 100 grams/$m^2$ to about 200 grams/$m^2$; and/or
- a density of from about 0.05 grams/$cm^3$ to about 0.5 grams/$cm^3$, preferably from about 0.06 grams/$cm^3$ to about 0.4 grams/$cm^3$, more preferably from about 0.07 grams/$cm^3$ to about 0.2 grams/$cm^3$, most preferably from about 0.08 grams/$cm^3$ to about 0.15 grams/$cm^3$; and/or
- a Specific Surface Area of from about 0.03 $m^2$/g to about 0.25 $m^2$/g, preferably from about 0.04 $m^2$/g to about 0.22 $m^2$/g, more preferably from about 0.05 $m^2$/g to about 0.2 $m^2$/g, most preferably from about 0.1 $m^2$/g to about 0.18 $m^2$/g.

These and other aspects of the present invention will become more apparent upon reading the following detailed description of the invention.

DETAILED DESCRIPTION OF THE INVENTION

I. Definitions

Figure 1:
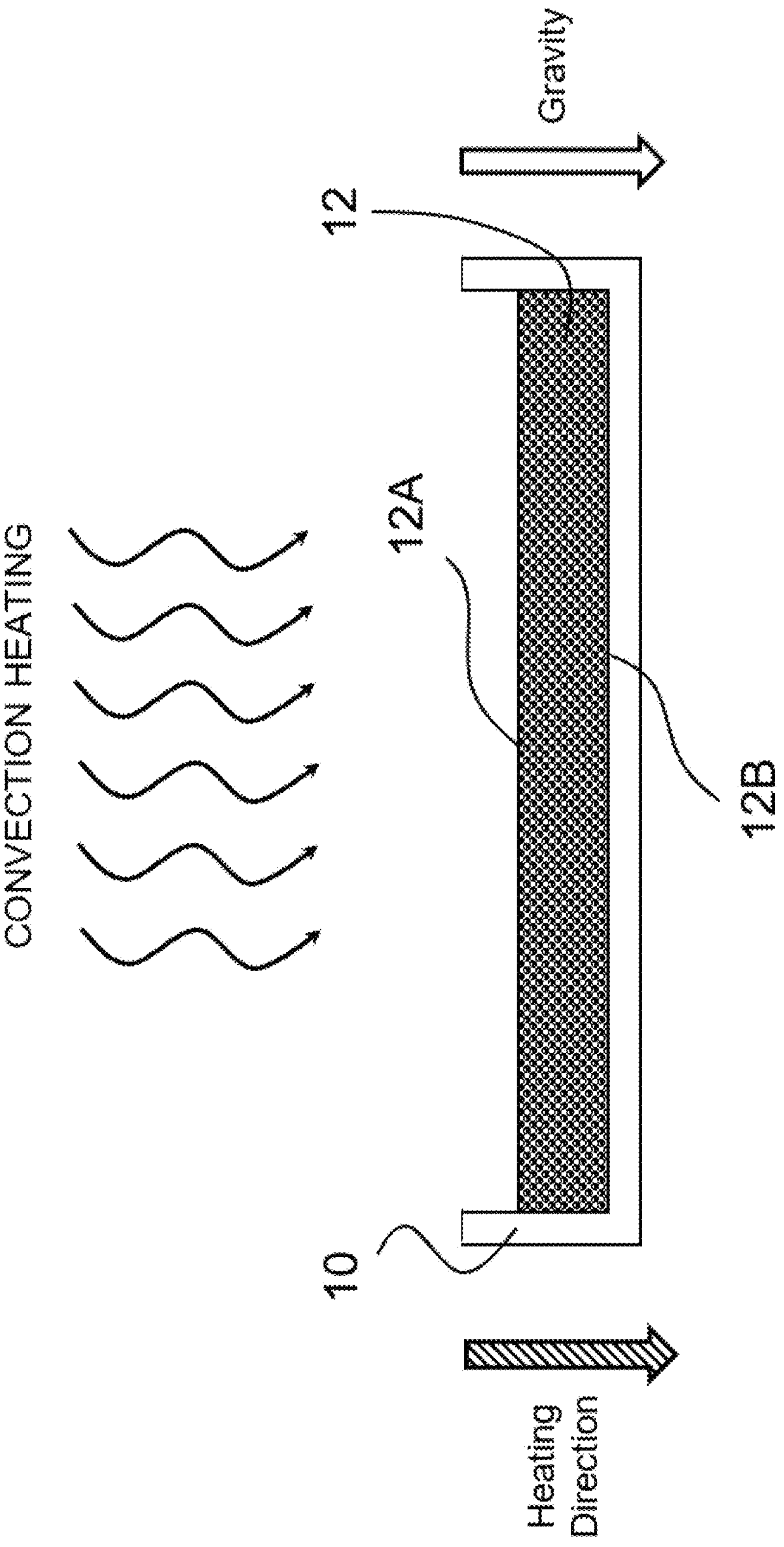
FIG. 1 shows a convection-based heating/drying arrangement for making a flexible, porous, dissolvable solid sheet in a batch process.

The term "solid" as used herein refers to the ability of an article to substantially retain its shape (i.e., without any visible change in its shape) at 20° C. and under the atmospheric pressure, when it is not confined and when no external force is applied thereto.

The term "flexible" as used herein refers to the ability of an article to withstand stress without breakage or significant fracture when it is bent at 90° along a center line perpendicular to its longitudinal direction. Preferably, such article can undergo significant elastic deformation and is characterized by a Young's Modulus of no more than 5 GPa, preferably no more than 1 GPa, more preferably no more than 0.5 GPa, most preferably no more than 0.2 GPa.

The term "dissolvable" as used herein refers to the ability of an article to completely or substantially dissolve in a sufficient amount of deionized water at 20° C. and under the atmospheric pressure within eight (8) hours without any stirring, leaving less than 5 wt % undissolved residues.

The term "sheet" as used herein refers to a non-fibrous structure having a three-dimensional shape, i.e., with a thickness, a length, and a width, while the length-to-thickness aspect ratio and the width-to-thickness aspect ratio are both at least about 5:1, and the length-to-width ratio is at least about 1:1. Preferably, the length-to-thickness aspect ratio and the width-to-thickness aspect ratio are both at least about 10:1, more preferably at least about 15:1, most preferably at least about 20:1; and the length-to-width aspect ratio is preferably at least about 1.2:1, more preferably at least about 1.5:1, most preferably at least about 1.618:1.

The term "sulfonates" or "sulfates" as used herein refers to compounds in either an un-neutralized sulfonic acid or sulfuric acid form, or a neutralized salt form, or as a mixture of both (i.e., partially neutralized).

The term "polyvinyl alcohol" or "polyvinyl alcohols" or "PVA" or "PVAs" as used herein include both homopolymers and copolymers of polyvinyl alcohol. The copolymers may include a vinyl alcohol monomer and one or more monomers of another type.

The term "water-soluble" as used herein refers to the ability of a sample material to completely dissolve in or disperse into water leaving no visible solids or forming no visibly separate phase, when at least about 25 grams, preferably at least about 50 grams, more preferably at least about 100 grams, most preferably at least about 200 grams, of such material is placed in one liter (1 L) of deionized water at 20° C. and under the atmospheric pressure with sufficient stirring.

As used herein, the term "starch" refers to both naturally occurring or modified starches. Typical natural sources for starches can include cereals, tubers, roots, legumes and fruits. More specific natural sources can include corn, pea, potato, banana, barley, wheat, rice, sago, amaranth, tapioca, arrowroot, *canna*, sorghum, and waxy or high amylase varieties thereof. The natural starches can be modified by any modification method known in the art to form modified starches, including physically modified starches, such as sheared starches or thermally-inhibited starches; chemically modified starches, such as those which have been crosslinked, acetylated, and organically esterified, hydroxyethylated, and hydroxypropylated, phosphorylated, and inorganically esterified, cationic, anionic, nonionic, amphoteric and zwitterionic, and succinate and substituted succinate derivatives thereof; conversion products derived from any of the starches, including fluidity or thin-boiling starches prepared by oxidation, enzyme conversion, acid hydrolysis, heat or acid dextrinization, thermal and or sheared products may also be useful herein; and pregelatinized starches which are known in the art.

The term "major surfactant" refers to a surfactant that is present in a composition at an amount that is more than 50% by weight of the total surfactant content in said composition.

The term "minor surfactant" refers to a surfactant that is present in a composition at an amount that is no more than 50% by weight of the total surfactant content in said composition.

The term "open celled foam" or "open cell pore structure" as used herein refers to a solid, interconnected, polymer-containing matrix that defines a network of spaces or cells that contain a gas, typically a gas (such as air), without collapse of the foam structure during the drying process, thereby maintaining the physical strength and cohesiveness of the solid. The interconnectivity of the structure may be described by a Percent Open Cell Content, which is measured by Test 3 disclosed hereinafter.

As used herein, the term "bottom surface" refers to a surface of the flexible, porous, dissolvable solid sheet of the present invention that is immediately contacting a supporting surface upon which the sheet of aerated wet pre-mixture is placed during the drying step, while the term "top surface" refers to a surface of said sheet that is opposite to the bottom surface. Further, such solid sheet can be divided into three (3) regions along its thickness, including a top region that is adjacent to its top surface, a bottom region that is adjacent to its bottom surface, and a middle region that is located between the top and bottom regions. The top, middle, and bottom regions are of equal thickness, i.e., each having a thickness that is about ⅓ of the total thickness of the sheet.

The term "aerate", "aerating" or "aeration" as used herein refers to a process of introducing a gas into a liquid or pasty composition by mechanical and/or chemical means.

The term "heating direction" as used herein refers to the direction along which a heat source applies thermal energy to an article, which results in a temperature gradient in such article that decreases from one side of such article to the other side. For example, if a heat source located at one side of the article applies thermal energy to said article to generate a temperature gradient that decreases from said one side to an opposing side, the heating direction is then deemed as extending from said one side to the opposing side. If both sides of such article, or different sections of such article, are heated simultaneously with no observable temperature gradient across such article, then the heating is carried out in a non-directional manner, and there is no heating direction.

The term "substantially opposite to" or "substantially offset from" as used herein refers to two directions or two lines having an offset angle of 90° or more therebetween.

The term "substantially aligned" or "substantial alignment" as used herein refers to two directions or two lines having an offset angle of less than 90° therebetween.

The term "primary heat source" as used herein refers to a heat source that provides more than 50%, preferably more than 60%, more preferably more than 70%, most preferably more than 80%, of the total thermal energy absorbed by an object (e.g., the sheet of aerated wet pre-mixture according to the present invention).

The term "controlled surface temperature" as used herein refers to a surface temperature that is relatively consistent, i.e., with less than +/−20% fluctuations, preferably less than +/−10% fluctuations, more preferably less than +/−5% fluctuations.

The term "essentially free of" or "essentially free from" means that the indicated material is at the very minimal not deliberately added to the composition or product, or preferably not present at an analytically detectible level in such composition or product. It may include compositions or products in which the indicated material is present only as an impurity of one or more of the materials deliberately added to such compositions or products.

It has been a surprising and unexpected discovery of the present invention that when polyvinyl alcohol having a specific weight average molecular weight (i.e., from about 50,000 to about 400,000 Daltons, preferably from about 60,000 to about 300,000 Daltons, more preferably from about 70,000 to about 200,000 Daltons, most preferably from about 80,000 to about 150,000 Daltons) is used as the film-former in forming a flexible and dissolvable solid sheet article, the resulting solid sheet article may have "stabilized" or improved film-forming property even when other surfactants (such as LAS and/or STS) are used as the major surfactant therein. This discovery reduces or eliminates the need for non-aromatic and unalkoxylated alkyl sulfates (AS), which have relatively poorer cleaning performance in comparison with such other surfactants.

II. Formulations of Inventive Solid Sheets

1. Polyvinyl Alcohol (PVA)

As mentioned hereinabove, the flexible and dissolvable solid sheet of the present invention may comprise polyvinyl alcohol (PVA) polymer or copolymer thereof as a film-former, a structurant as well as a carrier for the surfactant(s) and optionally other active ingredients (e.g., emulsifiers, builders, chelants, perfumes, colorants, and the like). It is preferred that the PVA polymer or copolymer is present in the flexible and dissolvable solid sheet article of the present invention in an amount ranging from about 5% to about 50%, preferably from about 10% to about 40%, preferably from about 15% to about 30%, more preferably from about 20% to about 25%, by total weight of the solid sheet. In a particularly preferred embodiment of the present invention, the total amount of PVA(s) present in the flexible and dissolvable solid sheet article of the present invention is no more than 25% by total weight of such sheet article.

PVA polymers or copolymers suitable for the practice of the present invention are selected those with weight average molecular weights ranging from about 50,000 to about 400,000 Daltons, preferably from about 60,000 to about 300,000 Daltons, more preferably from about 70,000 to about 200,000 Daltons, most preferably from about 80,000 to about 150,000 Daltons. The weight average molecular weight is computed by summing the average molecular weights of each polymer raw material multiplied by their respective relative weight percentages by weight of the total weight of polymers present within the porous solid.

The flexible and dissolvable solid sheet article of the present invention is preferably made by first forming a wet pre-mixture containing the PVA, the surfactant(s) and optionally other active ingredients, followed by shaping the wet pre-mixture into a sheet and then drying such sheet of wet pre-mixture to form a solidified sheet article. Correspondingly, the weight average molecular weight of the PVA polymer or copolymer may affect the overall film-forming properties of the wet pre-mixture and its compatibility/incompatibility with the desired surfactants. Further, the weight average molecular weight of the PVA polymer or copolymer used herein may impact the viscosity of the wet pre-mixture, which may in turn influence various physical properties of the resulting solid sheet article so formed.

The PVA polymer or copolymer of the present invention may further be characterized by a degree of hydrolysis ranging from about 40% to about 100%, preferably from about 50% to about 95%, more preferably from about 70% to about 92%, most preferably from about 80% to about 90%.

The PVA copolymer of the present invention may include a vinyl alcohol monomer and one or more monomers of any other type. Preferred PVA copolymers for the practice of the present invention include, in addition to the vinyl alcohol monomer and one or more anionic monomers represented by Formula (I) and/or (II) at below:

(I)

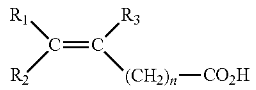

(II)

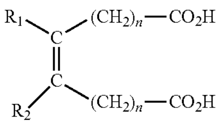

wherein $R_1$, $R_2$ and $R_3$ are each independently H or methyl, and n is independently an integer of 0 to 3. The above-described anionic monomeric unit, if present, is preferably present in an amount ranging from about 0.5 to about 5 mol %.

Commercially available polyvinyl alcohols include those from Celanese Corporation (Texas, USA) under the CELVOL trade name including, but not limited to, CELVOL 523, CELVOL 530, CELVOL 540, CELVOL 518, CELVOL 513, CELVOL 508, CELVOL 504; those from Kuraray Europe GmbH (Frankfurt, Germany) under the Mowiol® and POVAL™ trade names; and PVA 1788 (also referred to as PVA BP17) commercially available from various suppliers including Lubon Vinylon Co. (Nanjing, China); and combinations thereof. In a particularly preferred embodiment of the present invention, the flexible, porous, dissolvable solid sheet comprises from about 10% to about 25%, more preferably from about 15% to about 23%, by total weight of such article, of a polyvinyl alcohol having a weight average molecular weight ranging from 80,000 to about 150,000 Daltons and a degree of hydrolysis ranging from about 80% to about 90%.

In addition to PVAs as mentioned hereinabove, a single starch or a combination of starches may be used as a filler material in such an amount as to reduce the overall level of PVAs required, so long as it helps provide the solid sheet article with the requisite structure and physical/chemical characteristics as described herein. However, too much starch may comprise the solubility and structural integrity of the solid sheet article. Therefore, in preferred embodiments of the present invention, it is desired that the solid sheet article comprises no more than 20%, preferably from 0% to 10%, more preferably from 0% to 5%, most preferably from 0% to 1%, by weight of said solid sheet article, of starch.

2. Surfactants

In addition to PVA described hereinabove, the flexible and dissolvable solid sheet article of the present invention comprises one or more surfactants selected from the group consisting of anionic surfactants, nonionic surfactants, cationic surfactants, zwitterionic surfactants, amphoteric surfactants, polymeric surfactants or combinations thereof.

One benefit of the present invention is that the solid sheet article of the present invention may be porous and characterized by a unique open cell foam (OCF) structure (as described hereinafter), which allows for incorporation of a high surfactant content while still providing fast dissolution. Consequently, highly concentrated cleansing compositions can be formulated into the solid sheet articles of the present invention to provide a new and superior cleansing experience to the consumers. Preferably, the solid sheet article of the present invention comprises from about 30% to about 80%, preferably from about 40% to about 70%, more preferably from about 50% to about 65%, of surfactants by total weight of said solid sheet.

The surfactant as used herein may include both surfactants from the conventional sense (i.e., those providing a consumer-noticeable lathering effect) and emulsifiers (i.e., those that do not provide any lathering performance but are intended primarily as a process aid in making a stable foam structure). Examples of emulsifiers for use as a surfactant component herein include mono- and di-glycerides, fatty alcohols, polyglycerol esters, propylene glycol esters, sorbitan esters and other emulsifiers known or otherwise commonly used to stabilize air interfaces.

Non-limiting examples of anionic surfactants suitable for use herein include alkyl and alkyl ether sulfates, sulfated monoglycerides, sulfonated olefins, alkyl aryl sulfonates, primary or secondary alkane sulfonates, alkyl sulfosuccinates, acyl taurates, acyl isethionates, alkyl glycerylether sulfonate, sulfonated methyl esters, sulfonated fatty acids, alkyl phosphates, acyl glutamates, acyl sarcosinates, alkyl sulfoacetates, acylated peptides, alkyl ether carboxylates, acyl lactylates, anionic fluorosurfactants, sodium lauroyl glutamate, and combinations thereof.

One category of anionic surfactants particularly suitable for practice of the present invention include $C_6$-$C_{20}$ linear alkylbenzene sulphonate (LAS) surfactant. LAS surfactants are well known in the art and can be readily obtained by sulfonating commercially available linear alkylbenzenes. Exemplary $C_{10}$-$C_{20}$ linear alkylbenzene sulfonates that can be used in the present invention include alkali metal, alkaline earth metal or ammonium salts of $C_{10}$-$C_{20}$ linear alkylbenzene sulfonic acids, and preferably the sodium, potassium, magnesium and/or ammonium salts of $C_{11}$-$C_{18}$ or $C_{11}$-$C_{14}$ linear alkylbenzene sulfonic acids. More preferred are the sodium or potassium salts of $C_{12}$ and/or $C_{14}$ linear alkylbenzene sulfonic acids, and most preferred is the sodium salt of $C_{12}$ and/or $C_{14}$ linear alkylbenzene sulfonic acid, i.e., sodium dodecylbenzene sulfonate or sodium tetradecylbenzene sulfonate.

LAS provides superior cleaning benefit and is especially suitable for use in laundry detergent applications. It has been a surprising and unexpected discovery of the present invention that when polyvinyl alcohol having a specific weight average molecular weight (as described hereinabove) is used as the film-former and carrier, LAS can be used as a major surfactant, without adversely affecting the film-forming performance and stability of the overall composition. Correspondingly, in a particular embodiment of the present invention, LAS is used as the major surfactant in the solid sheet article. If present, the amount of LAS in the solid sheet article of the present invention may range from about 25% to about 70%, preferably from about 30% to about 65%, more preferably from about 40% to about 60%, by total weight of the solid sheet article.

Another category of anionic surfactants suitable for practice of the present invention include sodium trideceth sulfates (STS) having a weight average degree of alkoxylation ranging from about 0.5 to about 5, preferably from about 0.8 to about 4, more preferably from about 1 to about 3, most preferably from about 1.5 to about 2.5. Trideceth is a 13-carbon branched alkoxylated hydrocarbon comprising, in one embodiment, an average of at least 1 methyl branch per molecule. STS used by the present invention may be include ST(EOxPOy)S, while EOx refers to repeating ethylene oxide units with a repeating number x ranging from 0 to 5, preferably from 1 to 4, more preferably from 1 to 3, and while POy refers to repeating propylene oxide units with a repeating number y ranging from 0 to 5, preferably from 0 to 4, more preferably from 0 to 2. It is understood that a material such as ST2 S with a weight average degree of ethoxylation of about 2, for example, may comprise a significant amount of molecules which have no ethoxylate, 1 mole ethoxylate, 3 mole ethoxylate, and so on, while the distribution of ethoxylation can be broad, narrow or truncated, which still results in an overall weight average degree of ethoxylation of about 2. STS is particularly suitable for personal cleansing applications, and it has been a surprising and unexpected discovery of the present invention that when polyvinyl alcohol having a specific weight average molecular weight (as described hereinabove) is used as the film-former and carrier, STS can be used as a major surfactant, without adversely affecting the film-forming performance and stability of the overall composition. Correspondingly, in a particular embodiment of the present invention, STS is used as the major surfactant in the solid sheet article. If present, the amount of STS in the solid sheet article of the present invention may range from about 25% to about 70%, preferably from about 30% to about 65%, more preferably from about 40% to about 60%, by total weight of the solid sheet article.

Another category of anionic surfactants suitable for practice of the present invention include alkyl sulfates. These materials have the respective formulae $ROSO_3M$, wherein R is alkyl or alkenyl of from about 6 to about 20 carbon atoms, x is 1 to 10, and M is a water-soluble cation such as ammonium, sodium, potassium and triethanolamine. Preferably, R has from about 6 to about 18, preferably from about 8 to about 16, more preferably from about 10 to about 14, carbon atoms. Previously, non-aromatic and unalkoxylated $C_6$-$C_{20}$ linear or branched alkyl sulfates (AS) have been considered the surfactants of choice in flexible and dissolvable solid sheet articles, especially as the major surfactant therein, due to its compatibility with low molecular weight polyvinyl alcohols (e.g., those with a weight average molecular weight of less more than 50,000 Daltons) in film-forming performance and storage stability. However, it has been a surprising and unexpected discovery of the present invention that when polyvinyl alcohol having a higher weight average molecular weight (e.g., from about 50,000 to about 400,000 Daltons, preferably from about 60,000 to about 300,000 Daltons, more preferably from about 70,000 to about 200,000 Daltons, most preferably from about 80,000 to about 150,000 Daltons) is used as the film-former and carrier, surfactants such as LAS and/or STS with better cleaning performance and lower cost can be used as the major surfactant in the solid sheet article, without adversely affecting the film-forming performance and stability of the overall composition. Therefore, in a particularly preferred embodiment of the present invention, it is desirable to provide a solid sheet article with no more than about 20%, preferably from 0% to about 10%, more preferably from 0% to about 5%, most preferably from 0% to about 1%, by weight of said solid sheet article, of AS.

Another category of anionic surfactants suitable for practice of the present invention include $C_6$-$C_{20}$ linear or branched alkylalkoxy sulfates (AAS), especially those having a weight average degree of alkoxylation ranging from about 0.5 to about 10, preferably from about 1 to about 5, more preferably from about 2 to about 4. Among this category, linear or branched alkylethoxy sulfates (AES) having the respective formulae $RO(C_2H_4O)_xSO_3M$ are particularly preferred, wherein R is alkyl or alkenyl of from about 6 to about 20 carbon atoms, x is 1 to 10, and M is a water-soluble cation such as ammonium, sodium, potassium and triethanolamine. Preferably, R has from about 6 to about 18, preferably from about 8 to about 16, more preferably from about 10 to about 14, carbon atoms. The AES surfactants are typically made as condensation products of ethylene oxide and monohydric alcohol's having from about 6 to about 20 carbon atoms. Useful alcohols can be derived from fats, e.g., coconut oil or tallow, or can be synthetic. Lauryl alcohol and straight chain alcohol's derived from coconut oil are preferred herein. Such alcohol's are reacted with about 1 to about 10, preferably from about 3 to about 5, and especially about 3, molar proportions of ethylene oxide and the resulting mixture of molecular species having, for example, an average of 3 moles of ethylene oxide per mole of alcohol, is sulfated and neutralized. Highly preferred AAS (or preferably AES) are those comprising a mixture of individual compounds, said mixture having an average alkyl chain length of from about 10 to about 16 carbon atoms and an average degree of ethoxylation of from about 1 to about 4 moles of ethylene oxide. If present, the the amount of AAS in the solid sheet of the present invention may range from about 2% to about 40%, preferably from about 5% to about 30%, more preferably from about 8% to about 12%, by total weight of the solid sheet article.

Other suitable anionic surfactants include water-soluble salts of the organic, sulfuric acid reaction products of the general formula [$R^1$—$SO_3$-M], wherein $R^1$ is chosen from the group consisting of a straight or branched chain, saturated aliphatic hydrocarbon radical having from about 6 to about 20, preferably about 10 to about 18, carbon atoms; and M is a cation. Preferred are alkali metal and ammonium sulfonated $C_{10-18}$ n-paraffins. Other suitable anionic surfactants include olefin sulfonates having about 12 to about 24 carbon atoms. The α-olefins from which the olefin sulfonates are derived are mono-olefins having about 12 to about 24 carbon atoms, preferably about 14 to about 16 carbon atoms. Preferably, they are straight chain olefins.

Another class of anionic surfactants suitable for use in the fabric and home care compositions is the β-alkyloxy alkane sulfonates. These compounds have the following formula:

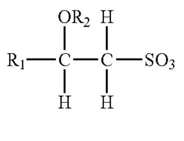

where $R_1$ is a straight chain alkyl group having from about 6 to about 20 carbon atoms, $R_2$ is a lower alkyl group having from about 1 (preferred) to about 3 carbon atoms, and M is a water-soluble cation as hereinbefore described.

Additional examples of suitable anionic surfactants are the reaction products of fatty acids esterified with isethionic acid and neutralized with sodium hydroxide where, for example, the fatty acids are derived from coconut oil; sodium or potassium salts of fatty acid amides of methyl tauride in which the fatty acids, for example, are derived from coconut oil. Still other suitable anionic surfactants are the succinamates, examples of which include disodium N-octadecylsulfosuccinamate; diammoniumlauryl sulfosuccinamate; tetrasodium N-(1,2-dicarboxyethyl)-N-octadecylsulfosuccinamate; diamyl ester of sodium sulfosuccinic acid; dihexyl ester of sodium sulfosuccinic acid; and dioctyl esters of sodium sulfosuccinic acid.

Nonionic surfactants that can be included into the solid sheet of the present invention may be any conventional nonionic surfactants, including but not limited to: alkyl alkoxylated alcohols, alkyl alkoxylated phenols, alkyl polysaccharides (especially alkyl glucosides and alkyl polyglucosides), polyhydroxy fatty acid amides, alkoxylated fatty acid esters, sucrose esters, sorbitan esters and alkoxylated derivatives of sorbitan esters, amine oxides, and the like. Preferred nonionic surfactants are those of the formula $R^1(OC_2H_4)_nOH$, wherein $R^1$ is a $C_8$-$C_{18}$ alkyl group or alkyl phenyl group, and n is from about 1 to about 80. Particularly preferred are $C_8$-$C_{18}$ alkyl ethoxylated alcohols having a weight average degree of ethoxylation from about 1 to about 20, preferably from about 5 to about 15, more preferably from about 7 to about 10, such as NEODOL® nonionic surfactants commercially available from Shell. Other non-limiting examples of nonionic surfactants useful herein include: $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched alkyl alkoxylates, $BAE_x$, wherein x is from 1 to 30; alkyl polysaccharides, specifically alkyl polyglycosides; Polyhydroxy fatty acid amides; and ether capped poly(oxyalkylated) alcohol surfactants. Suitable nonionic surfactants also include those sold under the tradename Lutensol® from BASF.

In a preferred embodiment, the nonionic surfactant is selected from sorbitan esters and alkoxylated derivatives of sorbitan esters including sorbitan monolaurate (SPAN® 20), sorbitan monopalmitate (SPAN® 40), sorbitan monostearate (SPAN® 60), sorbitan tristearate (SPAN® 65), sorbitan monooleate (SPAN® 80), sorbitan trioleate (SPAN® 85), sorbitan isostearate, polyoxyethylene (20) sorbitan monolaurate (Tween® 20), polyoxyethylene (20) sorbitan monopalmitate (Tween® 40), polyoxyethylene (20) sorbitan monostearate (Tween® 60), polyoxyethylene (20) sorbitan monooleate (Tween® 80), polyoxyethylene (4) sorbitan monolaurate (Tween® 21), polyoxyethylene (4) sorbitan monostearate (Tween® 61), polyoxyethylene (5) sorbitan monooleate (Tween® 81), all available from Uniqema, and combinations thereof.

The most preferred nonionic surfactants for practice of the present invention include $C_6$-$C_{20}$ linear or branched alkylalkoxylated alcohols (AA) having a weight average degree of alkoxylation ranging from 5 to 15, more preferably $C_{12}$-$C_{14}$ linear ethoxylated alcohols having a weight average degree of alkoxylation ranging from 7 to 9. If present, the amount of AA-type nonionic surfactant(s) in the solid sheet of the present invention may range from about 2% to about 40%, preferably from about 5% to about 30%, more preferably from about 8% to about 12%, by total weight of the solid sheet.

In a preferred embodiment of the present invention, the flexible and dissolvable solid sheet article comprises from about 25% to about 70%, preferably from about 30% to about 65%, more preferably from about 40% to about 60%, by weight of said solid sheet article, of a first surfactant that is LAS, STS, or a combination thereof. More preferably, such first surfactant is present as the major surfactant in the solid sheet article.

In a particularly preferred embodiment of the present invention, the flexible and dissolvable solid sheet article comprises, in addition to the first surfactant described hereinabove, from about 5% to about 40%, preferably from about 10% to about 30%, more preferably from about 15% to about 25%, by weight of said solid sheet article, of a second surfactant that is AAS, AA, or a combination thereof.

The flexible and dissolvable solid sheet article of the present invention may further include one or more amphoteric surfactants. Amphoteric surfactants suitable for use in the solid sheet of the present invention includes those that are broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecyl-aminopropionate, sodium 3-dodecylaminopropane sulfonate, sodium lauryl sarcosinate, N-alkyltaurines such as the one prepared by reacting dodecylamine with sodium isethionate, and N-higher alkyl aspartic acids.

One category of amphoteric surfactants particularly suitable for incorporation into solid sheets with personal care applications (e.g., shampoo, facial or body cleanser, and the like) include alkylamphoacetates, such as lauroamphoacetate and cocoamphoacetate. Alkylamphoacetates can be comprised of monoacetates and diacetates. In some types of alkylamphoacetates, diacetates are impurities or unintended reaction products. If present, the amount of alkylamphoacetate(s) in the solid sheet of the present invention may range from about 2% to about 40%, preferably from about 5% to about 30%, more preferably from about 10% to about 20%, by total weight of the solid sheet.

Zwitterionic surfactants suitable include those that are broadly described as derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one contains an anionic group, e.g., carboxy, sulfonate, sulfate, phosphate, or phosphonate. Such suitable zwitterionic surfactants can be represented by the formula:

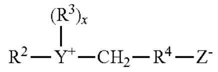

wherein $R^2$ contains an alkyl, alkenyl, or hydroxy alkyl radical of from about 8 to about 18 carbon atoms, from 0 to about 10 ethylene oxide moieties and from 0 to about 1 glyceryl moiety; Y is selected from the group consisting of nitrogen, phosphorus, and sulfur atoms; $R^3$ is an alkyl or monohydroxyalkyl group containing about 1 to about 3 carbon atoms; X is 1 when Y is a sulfur atom, and 2 when Y is a nitrogen or phosphorus atom; $R^4$ is an alkylene or hydroxyalkylene of from about 1 to about 4 carbon atoms and Z is a radical selected from the group consisting of carboxylate, sulfonate, sulfate, phosphonate, and phosphate groups.

Other zwitterionic surfactants suitable for use herein include betaines, including high alkyl betaines such as coco dimethyl carboxymethyl betaine, cocoamidopropyl betaine, cocobetaine, lauryl amidopropyl betaine, oleyl betaine, lauryl dimethyl carboxymethyl betaine, lauryl dimethyl alphacarboxyethyl betaine, cetyl dimethyl carboxymethyl betaine, lauryl bis-(2-hydroxyethyl) carboxymethyl betaine, stearyl bis-(2-hydroxypropyl) carboxymethyl betaine, oleyl dimethyl gamma-carboxypropyl betaine, and lauryl bis-(2-hydroxypropyl)alpha-carboxyethyl betaine. The sulfobetaines may be represented by coco dimethyl sulfopropyl betaine, stearyl dimethyl sulfopropyl betaine, lauryl dimethyl sulfoethyl betaine, lauryl bis-(2-hydroxyethyl) sulfopropyl betaine and the like; amidobetaines and amidosulfobetaines, wherein the $RCONH(CH_2)_3$ radical, wherein R is a $C_{11}$-$C_{17}$ alkyl, is attached to the nitrogen atom of the betaine are also useful in this invention.

Cationic surfactants can also be utilized in the present invention, especially in fabric softener and hair conditioner products. When used in making products that contain cationic surfactants as the major surfactants, it is preferred that such cationic surfactants are present in an amount ranging from about 2% to about 30%, preferably from about 3% to about 20%, more preferably from about 5% to about 15% by total weight of the solid sheet.

Cationic surfactants may include DEQA compounds, which encompass a description of diamido actives as well as actives with mixed amido and ester linkages. Preferred DEQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyloxyethyl)-N,N-methylhydroxyethylammonium methylsulfate wherein the acyl group is derived from animal fats, unsaturated, and polyunsaturated, fatty acids.

Other suitable actives for use as a cationic surfactant include reaction products of fatty acids with dialkylenetriamines in, e.g., a molecular ratio of about 2:1, said reaction products containing compounds of the formula:

$$R^1—C(O)—NH—R^2—NH—R^3—NH—C(O)—R^1$$

wherein $R^1$, $R^2$ are defined as above, and each $R^3$ is a $C_{1-6}$ alkylene group, preferably an ethylene group. Examples of these actives are reaction products of tallow acid, canola acid, or oleic acids with diethylenetriamine in a molecular ratio of about 2:1, said reaction product mixture containing N,N"-ditallowoyldiethylenetriamine, N,N"-dicanola-oyldiethylenetriamine, or N,N"-dioleoyldiethylenetriamine, respectively, with the formula:

$$R^1—C(O)—NH—CH_2CH_2—NH—CH_2CH_2—NH—C(O)—R^1$$

wherein $R^2$ and $R^3$ are divalent ethylene groups, $R^1$ is defined above and an acceptable examples of this structure when $R^1$ is the oleoyl group of a commercially available oleic acid derived from a vegetable or animal source, include EMERSOL®223LL or EMERSOL® 7021, available from Henkel Corporation.

Another active for use as a cationic surfactant has the formula:

$$[R^1—C(O)—NR—R^2—N(R)_2—R^3—NR—C(O)—R^1]^+X^-$$

wherein R, $R^1$, $R^2$, $R^3$ and $X^-$ are defined as above. Examples of this active are the di-fatty amidoamines based softener having the formula:

$$[R^1—C(O)—NH—CH_2CH_2—N(CH_3)(CH_2CH_2OH)—CH_2CH_2—NH—C(O)—R^1]^+ CH_3SO_4—$$

wherein $R^1$—C(O) is an oleoyl group, soft tallow group, or a hardened tallow group available commercially from Degussa under the trade names VARISOFT® 222LT, VARISOFT® 222, and VARISOFT® 110, respectively.

A second type of DEQA ("DEQA (2)") compound suitable as a active for use as a cationic surfactant has the general formula:

$$[R_3N^+CH_2CH(YR^1)(CH_2YR^1)]X^-$$

wherein each Y, R, $R^1$, and $X^-$ have the same meanings as before. An example of a preferred DEQA (2) is the "propyl" ester quaternary ammonium fabric softener active having the formula 1,2-di(acyloxy)-3-trimethylammoniopropane chloride.

Suitable polymeric surfactants for use in the personal care compositions of the present invention include, but are not limited to, block copolymers of ethylene oxide and fatty alkyl residues, block copolymers of ethylene oxide and propylene oxide, hydrophobically modified polyacrylates, hydrophobically modified celluloses, silicone polyethers, silicone copolyol esters, diquaternary polydimethylsiloxanes, and co-modified amino/polyether silicones.

3. Plasticizers

In a preferred embodiment of the present invention, the flexible and dissolvable solid sheet article of the present invention further comprises a plasticizer, preferably in the amount ranging from about 0.1% to about 25%, preferably from about 0.5% to about 20%, more preferably from about 1% to about 15%, most preferably from 2% to 12%, by total weight of said solid sheet article.

Suitable plasticizers for use in the present invention include, for example, polyols, copolyols, polycarboxylic acids, polyesters, dimethicone copolyols, and the like.

Examples of useful polyols include, but are not limited to: glycerin, diglycerin, ethylene glycol, polyethylene glycol (especially 200-600), propylene glycol, butylene glycol, pentylene glycol, glycerol derivatives (such as propoxylated glycerol), glycidol, cyclohexane dimethanol, hexanediol, 2,2,4-trimethylpentane-1,3-diol, pentaerythritol, urea, sugar alcohols (such as sorbitol, mannitol, lactitol, xylitol, maltitol, and other mono- and polyhydric alcohols), mono-, di- and oligo-saccharides (such as fructose, glucose, sucrose, maltose, lactose, high fructose corn syrup solids, and dextrins), ascorbic acid, sorbates, ethylene bisformamide, amino acids, and the like.

Examples of polycarboxylic acids include, but are not limited to citric acid, maleic acid, succinic acid, polyacrylic acid, and polymaleic acid.

Examples of suitable polyesters include, but are not limited to, glycerol triacetate, acetylated-monoglyceride, diethyl phthalate, triethyl citrate, tributyl citrate, acetyl triethyl citrate, acetyl tributyl citrate.

Examples of suitable dimethicone copolyols include, but are not limited to, PEG-12 dimethicone, PEG/PPG-18/18 dimethicone, and PPG-12 dimethicone.

Other suitable platicizers include, but are not limited to, alkyl and allyl phthalates; napthalates; lactates (e.g., sodium, ammonium and potassium salts); sorbeth-30; urea; lactic acid; sodium pyrrolidone carboxylic acid (PCA); sodium hyraluronate or hyaluronic acid; soluble collagen; modified protein; monosodium L-glutamate; alpha & beta hydroxyl acids such as glycolic acid, lactic acid, citric acid, maleic acid and salicylic acid; glyceryl polymethacrylate; polymeric plasticizers such as polyquaterniums; proteins and amino acids such as glutamic acid, aspartic acid, and lysine; hydrogen starch hydrolysates; other low molecular weight esters (e.g., esters of $C_2$-$C_{10}$ alcohols and acids); and any other water soluble plasticizer known to one skilled in the art of the foods and plastics industries; and mixtures thereof.

Particularly preferred examples of plasticizers include glycerin, ethylene glycol, polyethyleneglycol, propylene glycol, and mixtures thereof. Most preferred plasticizer is glycerin.

4. Additional Ingredients

In addition to the above-described ingredients, e.g., the PVA polymer or copolymer, the surfactants, and the plasticizer, the flexible and dissolvable solid sheet article of the present invention may comprise one or more additional ingredients, depending on its intended application. Such one or more additional ingredients may be selected from the group consisting of fabric care actives, dishwashing actives, hard surface cleaning actives, beauty and/or skin care actives, personal cleansing actives, hair care actives, oral care actives, feminine care actives, baby care actives, and any combinations thereof.

Suitable fabric care actives include but are not limited to: organic solvents (linear or branched lower $C_1$-$C_8$ alcohols, diols, glycerols or glycols; lower amine solvents such as $C_1$-$C_4$ alkanolamines, and mixtures thereof; more specifically 1,2-propanediol, ethanol, glycerol, monoethanolamine and triethanolamine), carriers, hydrotropes, builders, chelants, dispersants, enzymes and enzyme stabilizers, catalytic materials, bleaches (including photobleaches) and bleach activators, perfumes (including encapsulated perfumes or perfume microcapsules), colorants (such as pigments and dyes, including hueing dyes), brighteners, dye transfer inhibiting agents, clay soil removal/anti-redeposition agents, structurants, rheology modifiers, suds suppressors, processing aids, fabric softeners, anti-microbial agents, and the like.

Suitable hair care actives include but are not limited to: moisture control materials of class II for frizz reduction (salicylic acids and derivatives, organic alcohols, and esters), cationic surfactants (especially the water-insoluble type having a solubility in water at 25° C. of preferably below 0.5 g/100 g of water, more preferably below 0.3 g/100 g of water), high melting point fatty compounds (e.g., fatty alcohols, fatty acids, and mixtures thereof with a melting point of 25° C. or higher, preferably 40° C. or higher, more preferably 45° C. or higher, still more preferably 50° C. or higher), silicone compounds, conditioning agents (such as hydrolyzed collagen with tradename Peptein 2000 available from Hormel, vitamin E with tradename Emix-d available from Eisai, panthenol available from Roche, panthenyl ethyl ether available from Roche, hydrolyzed keratin, proteins, plant extracts, and nutrients), preservatives (such as benzyl alcohol, methyl paraben, propyl paraben and imidazolidinyl urea), pH adjusting agents (such as citric acid, sodium citrate, succinic acid, phosphoric acid, sodium hydroxide, sodium carbonate), salts (such as potassium acetate and sodium chloride), coloring agents, perfumes or fragrances, sequestering agents (such as disodium ethylenediaminetetraacetate), ultraviolet and infrared screening and absorbing agents (such as octyl salicylate), hair bleaching agents, hair perming agents, hair fixatives, anti-dandruff agents, anti-microbial agents, hair growth or restorer agents, co-solvents or other additional solvents, and the like.

Suitable beauty and/or skin care actives include those materials approved for use in cosmetics and that are described in reference books such as the CTFA Cosmetic Ingredient Handbook, Second Edition, The Cosmetic, Toiletries, and Fragrance Association, Inc. 1988, 1992. Further non-limiting examples of suitable beauty and/or skin care actives include preservatives, perfumes or fragrances, coloring agents or dyes, thickeners, moisturizers, emollients, pharmaceutical actives, vitamins or nutrients, sunscreens, deodorants, sensates, plant extracts, nutrients, astringents, cosmetic particles, absorbent particles, fibers, anti-inflammatory agents, skin lightening agents, skin tone agent (which functions to improve the overall skin tone, and may include vitamin B3 compounds, sugar amines, hexamidine compounds, salicylic acid, 1,3-dihydroxy-4-alkybenzene such as hexylresorcinol and retinoids), skin tanning agents, exfoliating agents, humectants, enzymes, antioxidants, free radical scavengers, anti-wrinkle actives, anti-acne agents, acids, bases, minerals, suspending agents, pH modifiers, pigment particles, anti-microbial agents, insect repellents, shaving lotion agents, co-solvents or other additional solvents, and the like.

The solid sheet article of the present invention may further comprise other optional ingredients that are known for use or otherwise useful in compositions, provided that such optional materials are compatible with the selected essential materials described herein, or do not otherwise unduly impair product performance.

Non-limiting examples of product type embodiments that can be formed by the solid sheet of the present invention include laundry detergent products, fabric softening products, hand cleansing products, hair shampoo or other hair treatment products, body cleansing products, shaving preparation products, dish cleaning products, personal care substrates containing pharmaceutical or other skin care actives, moisturizing products, sunscreen products, beauty or skin care products, deodorizing products, oral care products, feminine cleansing products, baby care products, fragrance-containing products, and so forth.

Following are detailed descriptions on the processes of making the above-described flexible, dissolvable, and preferably porous solid sheet articles, as well as the methods of assembling them into the dissolvable multilayer structure of the present invention.

III. Overview of Processes for Making Sheets

The flexible and dissolvable solid sheet articles of the present invention can be formed by any suitable sheet-forming process. Preferably, such sheet-forming process includes an aeration step that leads to formation of porous structures, more preferably open-celled foam (OCF) structures, in the resulting solid sheet articles.

For example, WO2010077627 discloses a batch process for forming porous sheets with OCF structures characterized by a Percent Open Cell Content of from about 80% to 100%, which functions to improve dissolution. Specifically, a premixture of raw materials is first formed, which is vigorously aerated and then heat-dried in batches (e.g., in a convection oven or a microwave oven) to form the porous sheets with the desired OCF structures. Although such OCF structures significantly improve the dissolution rate of the resulting porous sheets, there is still a visibly denser and less porous bottom region with thicker cell walls in such sheets. Such high-density bottom region may negatively impact the flow of water through the sheets and thereby may adversely affect the overall dissolution rate of the sheets. When a plurality of such sheets is stacked together to form a multilayer structure, the “barrier” effect of multiple high-density bottom regions is especially augmented.

For another example, WO2012138820 discloses a similar process as that of WO2010077627, except that continuous drying of the aerated wet pre-mixture is achieved by using e.g., an impingement oven (instead of a convection oven or a microwave oven). The OCF sheets formed by such a continuous drying process are characterized by improved uniformity/consistency in the pore structures across different regions thereof. Unfortunately, there are still rate-limiting factors in such OCF sheets, such as a top surface with relatively smaller pore openings and a top region with relatively smaller pores (i.e., a crust-like top region), which may negatively impact the flow of water therethrough and slow down the dissolution thereof.

During the drying step in the above-described processes, the OCF structures are formed under simultaneous mechanisms of water evaporation, bubble collapse, interstitial liquid drainage from the thin film bubble facings into the plateau borders between the bubbles (which generates openings between the bubbles and forms the open cells), and solidification of the pre-mixture. Various processing conditions may influence these mechanisms, e.g., solid content in the wet pre-mixture, viscosity of the wet pre-mixture, gravity, and the drying temperature, and the need to balance such processing conditions so as to achieve controlled drainage and form the desired OCF structures.

It has been a surprising and unexpected discovery of the present invention that the direction of thermal energy employed (i.e., the heating direction) during the drying step may also have a significant impact on the resulting OCF structures, in addition to the above-mentioned processing conditions. For example, if the thermal energy is applied in a non-directional matter (i.e., there is no clear heating direction) during the drying step, or if the heating direction is substantially aligned with the gravitational direction (i.e., with an offset angle of less than 90° in between) during most of the drying step, the resulting flexible, porous, dissolvable solid sheet tends to have a top surface with smaller pore openings and greater pore size variations in different regions along the direction across its thickness. In contrast, when the heating direction is offset from the gravitation direction (i.e., with an offset angle of 90° or more therebetween) during most of the drying step, the resulting solid sheet may have a top surface with larger pore openings and reduced pore size variations in different regions along the direction across the thickness of such sheet. Correspondingly, the latter sheets are more receptive to water flowing through and are therefore more dissolvable than the former sheets.

While not being bound by any theory, it is believed that the alignment or misalignment between the heating direction and the gravitational direction during the drying step and the duration thereof may significantly affect the interstitial liquid drainage between the bubbles, and correspondingly impacting the pore expansion and pore opening in the solidifying pre-mixture and resulting in solid sheets with very different OCF structures. Such differences are illustrated more clearly by FIGS. 1-5 hereinafter.

FIG. 1 shows a convection-based heating/drying arrangement. During the drying step, a mold 10 (which can be made of any suitable materials, such as metal, ceramic or Teflon®) is filled with an aerated wet pre-mixture containing raw materials (e.g., the PVA polymer or copolymer, the surfactants, and optionally the plasticizer and any other active ingredients) dissolved in water, which forms a sheet 12 having a first side 12A (i.e., the top side) and an opposing second side 12B (i.e., the bottom side since it is in direct contact with a supporting surface of the mold 10). Such mold 10 is placed in a 130° C. convection oven for approximately 45-46 minutes during the drying step. The convection oven heats the sheet 12 from above, i.e., along a downward heating direction (as shown by the cross-hatched arrowhead), which forms a temperature gradient in said sheet 12 that decreases from the first side 12A to the opposing second side 12B. The downward heating direction is aligned with gravitational direction (as shown by the white arrowhead), and such an aligned position is maintained throughout the entire drying time. During drying, gravity drains the liquid pre-mixture downward toward the bottom region, while the downward heating direction dries the top region first and the bottom region last. As a result, a porous solid sheet is formed with a top surface that contains numerous pores with small openings formed by gas bubbles that have not had the chance to fully expand. Such a top surface with smaller pore openings is not optimal for water ingress into the sheet, which may limit the dissolution rate of the sheet. On the other hand, the bottom region of such sheet is dense and less porous, with larger pores that are formed by fully expanded gas bubbles, but which are very few in numbers, and the cell walls between the pores in such bottom region are thick due to the downward liquid drainage effectuated by gravity. Such a dense bottom region with fewer pores and thick cell walls is a further rate-limiting factor for the overall dissolution rate of the sheet.

Figure 2:
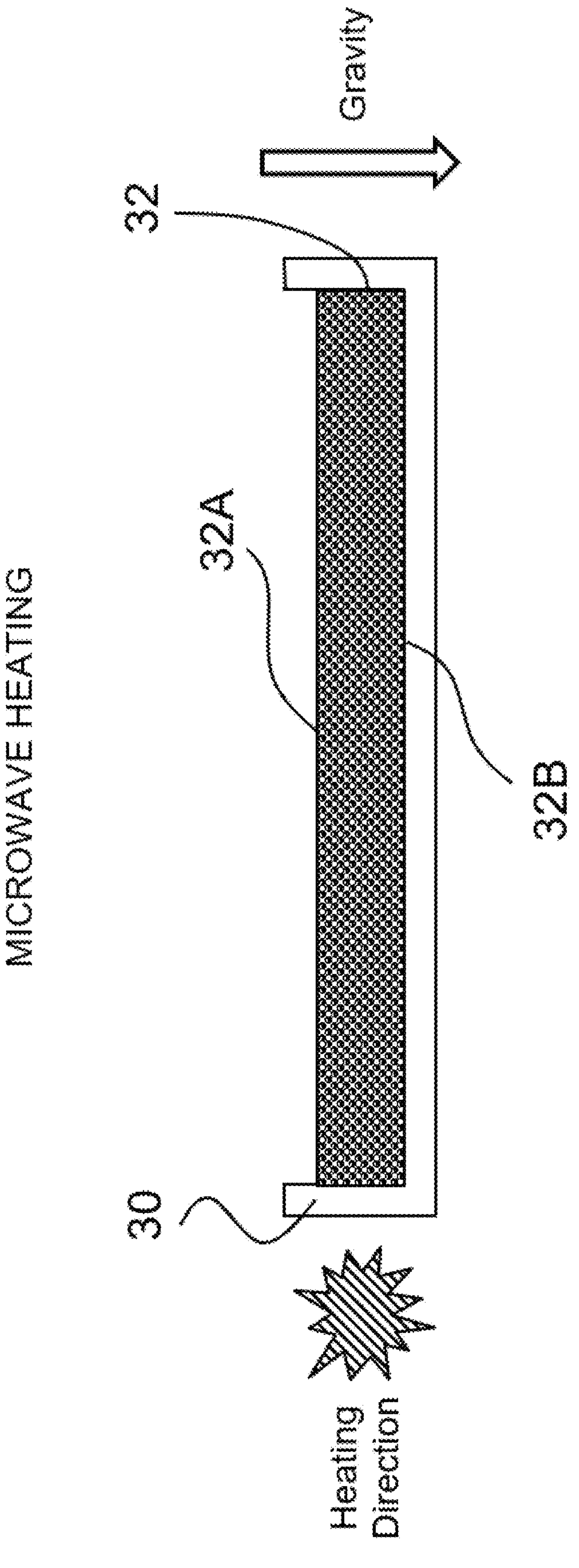
FIG. 2 shows a microwave-based heating/drying arrangement for making a flexible, porous, dissolvable solid sheet in a batch process.

FIG. 2 shows a microwave-based heating/drying arrangement. During the drying step, a mold 30 is filled with an aerated wet pre-mixture, which forms a sheet 32 having a first side 32A (the top side) and an opposing second side 32B (the bottom side). Such mold 30 is then placed in a low energy density microwave applicator (not shown), which is provided by Industrial Microwave System Inc., North Carolina and operated at a power of 2.0 kW, a belt speed of 1 foot per minute and a surrounding air temperature of 54.4° C. The mold 30 is placed in such microwave application for approximately 12 minutes during the drying step. Such microwave applicator heats the sheet 32 from within, without any clear or consistent heating direction. Correspondingly, no temperature gradient is formed in said sheet 32. During drying, the entire sheet 32 is simultaneously heated, or nearly simultaneously heated, although gravity (as shown by the white arrowhead) still drains the liquid pre-mixture downward toward the bottom region. As a result, the solidified sheet so formed has more uniformly distributed and more evenly sized pores, in comparison with sheet formed by the convection-based heating/drying arrangement. However, the liquid drainage under gravity force during the microwave-based drying step may still result in a dense bottom region with thick cell walls. Further, simultaneous heating of the entire sheet 32 may still limit the pore expansion and pore opening on the top surface during the drying step, and the resulting sheet may still have a top surface with relatively smaller pore openings. Further, the microwave energy heats water within the sheet 32 and causes such water to boil, which may generate bubbles of irregular sizes and form unintended dense regions with thick cell walls.

Figure 3:
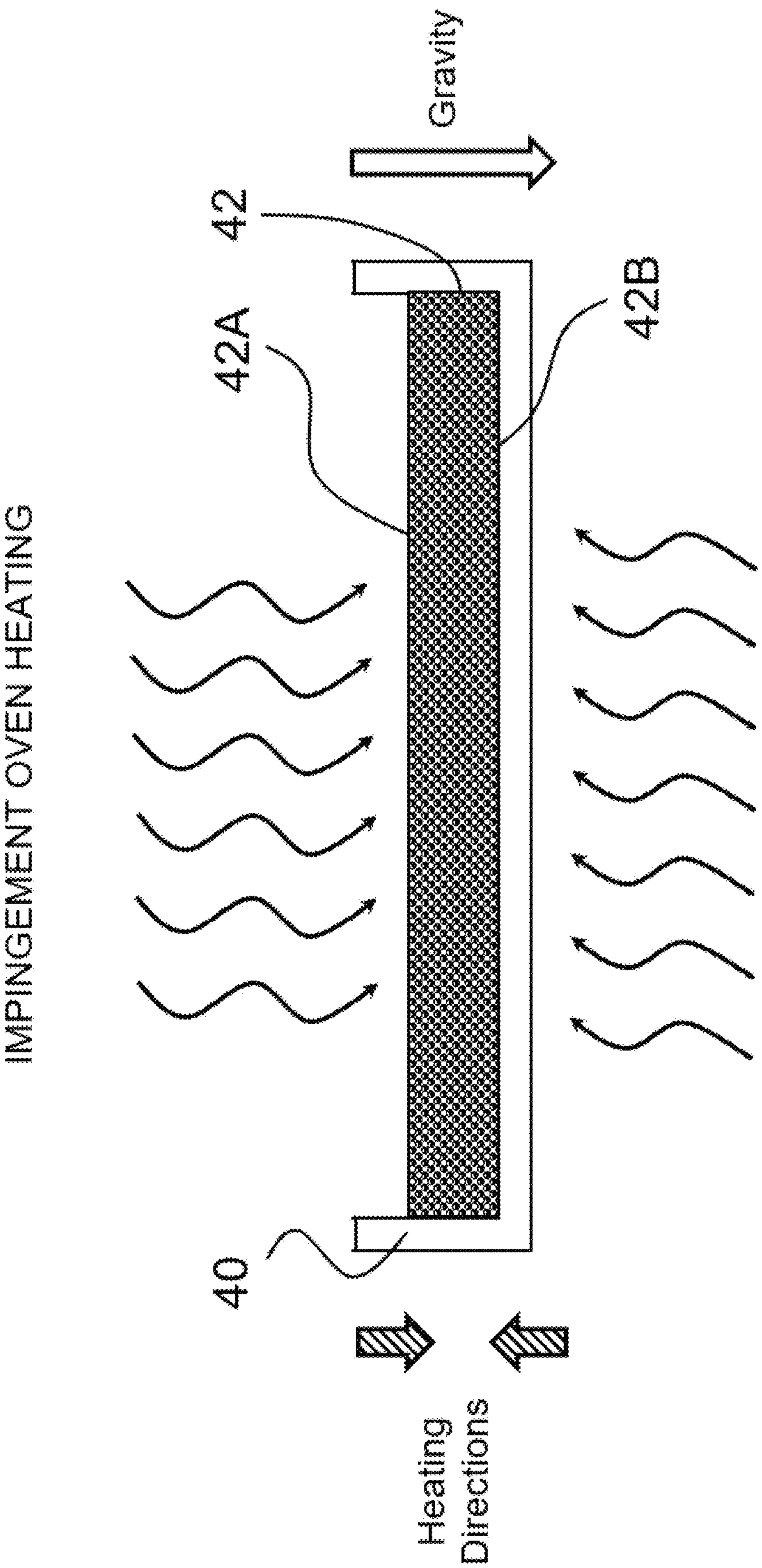
FIG. 3 shows an impingement oven-based heating/drying arrangement for making a flexible, porous dissolvable solid sheet in a continuous process.

FIG. 3 shows an impingement oven-based heating/drying arrangement. During the drying step, a mold 40 is filled with an aerated wet pre-mixture, which forms a sheet 42 having a first side 42A (the top side) and an opposing second side 42B (the bottom side). Such mold 40 is then placed in a continuous impingement oven (not shown) under conditions similar to those described in Example 1, Table 2 of WO2012138820. Such continuous impingement oven heats the sheet 42 from both top and bottom at opposing and offsetting heating directions (shown by the two cross-hatched arrowheads). Correspondingly, no clear temperature gradient is formed in said sheet 42 during drying, and the entire sheet 42 is nearly simultaneously heated from both its top and bottom surfaces. Similar to the microwave-based heating/drying arrangement described in FIG. 2, gravity (as shown by the white arrowhead) continues to drain the liquid pre-mixture downward toward the bottom region in such impingement oven-based heating/drying arrangement of FIG. 3. As a result, the solidified sheet so formed has more uniformly distributed and more evenly sized pores, in comparison with sheet formed by the convection-based heating/drying arrangement. However, the liquid drainage under gravity force during the drying step may still result in a dense bottom region with thick cell walls. Further, nearly simultaneous heating of the sheet 42 from both the may still limit the pore expansion and pore opening on the top surface during the drying step, and the resulting sheet may still have a top surface with relatively smaller pore openings.

In addition to the above-described heating/drying arrangements, the present invention discovers an improved heating/drying arrangement for drying the aerated wet pre-mixture (the so-called "anti-gravity" heating/drying arrangement), in which the direction of heating is purposefully configured to counteract/reduce liquid drainage caused by the gravitational force toward the bottom region (thereby reducing the density and improving pore structures in the bottom region) and to allow more time for the air bubbles near the top surface to expand during drying (thereby forming significantly larger pore openings on the top surface of the resulting sheet). Both features function to improve overall dissolution rate of the sheet and are therefore desirable.

Figure 4:
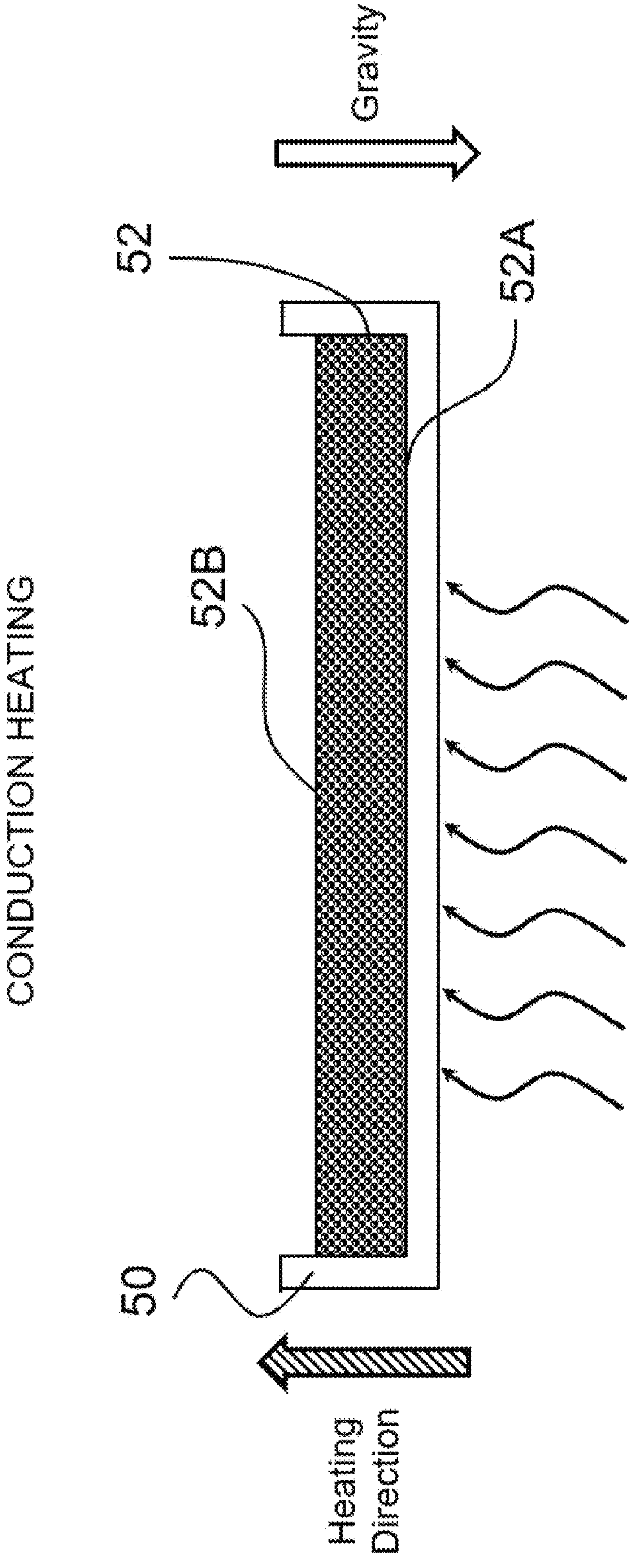
FIG. 4 shows a bottom conduction-based heating/drying arrangement for making a flexible, porous, dissolvable sheet in a batch process.

FIG. 4 shows a bottom conduction-based heating/drying arrangement for making a flexible, porous, dissolvable sheet, which is one type of anti-gravity arrangement according to one embodiment of the present invention. Specifically, a mold 50 is filled with an aerated wet pre-mixture, which forms a sheet 52 having a first side 52A (i.e., the bottom side) and an opposing second side 52B (i.e., the top side). Such mold 50 is placed on a heated surface (not shown), for example, on top of a pre-heated Peltier plate with a controlled surface temperature of about 125-130° C., for approximately 30 minutes during the drying step. Heat is conducted from the heated surface at the bottom of the mold 50 through the mold to heat the sheet 52 from below, i.e., along an upward heating direction (as shown by the cross-hatched arrowhead), which forms a temperature gradient in said sheet 52 that decreases from the first side 52A (the bottom side) to the opposing second side 52B (the top side). Such an upward heating direction is opposite to the gravitational direction (as shown by the white arrowhead), and it is maintained as so throughout the entire drying time (i.e., the heating direction is opposite to the gravitational direction for almost 100% of the drying time). During drying, the gravitational force still drains the liquid pre-mixture downward toward the bottom region. However, the upward heating direction dries the sheet from bottom up, and water vapor generated by heat at the bottom region arises upward to escape from the solidifying matrix, so the downward liquid drainage toward the bottom region is significantly limited and "counteracted"/reduced by the solidifying matrix and the uprising water vapor. Correspondingly, the bottom region of the resulting dry sheet is less dense and contains numerous pores with relatively thin cell walls. Further, because the top region is the last region that is dried during this process, the air bubbles in the top region have sufficient time to expand to form significantly larger open pores at the top surface of the resulting sheet, which are particularly effective in facilitating water ingress into the sheet. Moreover, the resulting sheet has a more evenly distributed overall pore sizes throughout different regions (e.g., top, middle, bottom) thereof.

Figure 5:
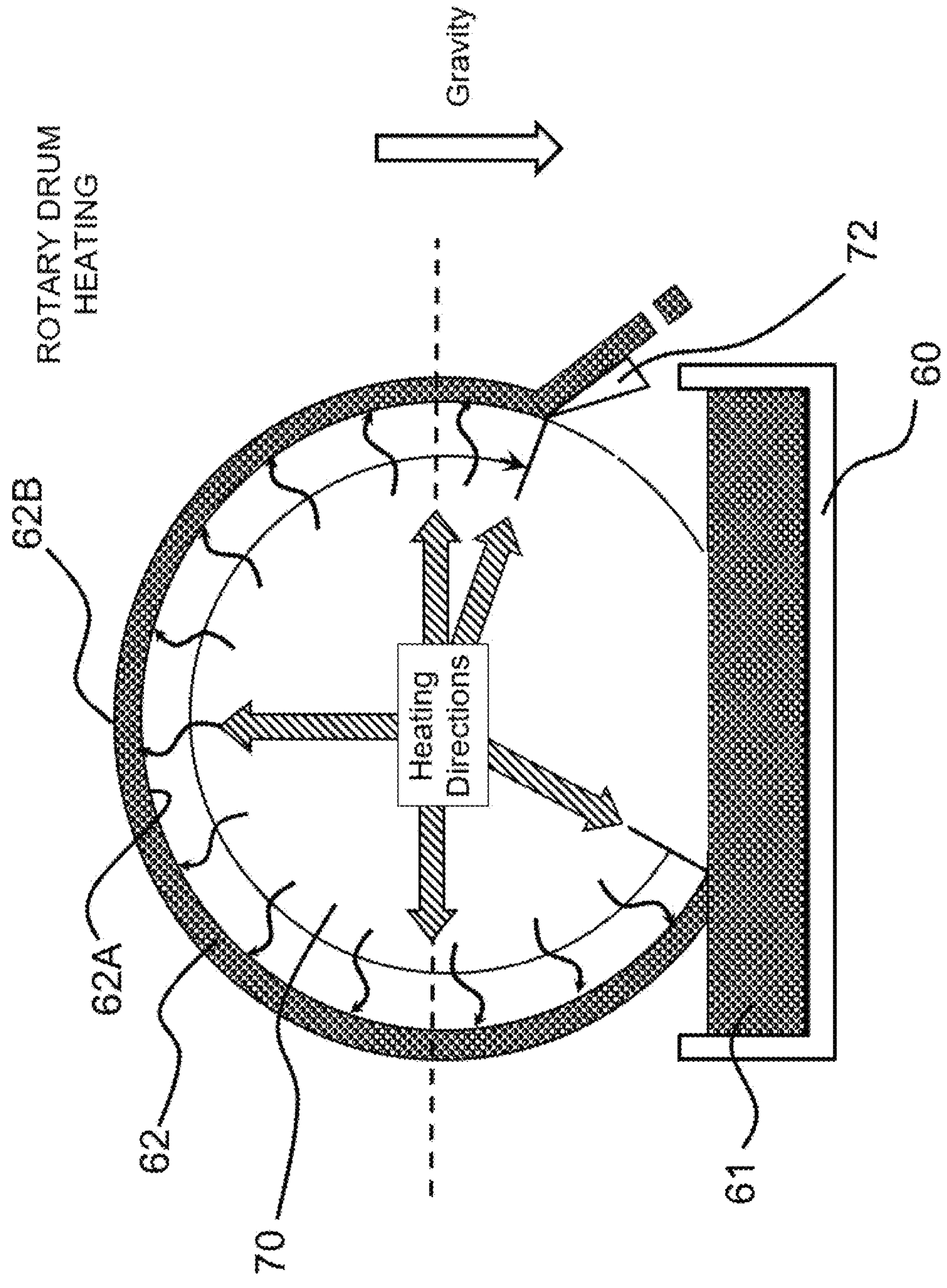
FIG. 5 shows a rotary drum-based heating/drying arrangement for making a flexible, porous, dissolvable sheet in a continuous process.

FIG. 5 shows a rotary drum-based heating/drying arrangement for making a flexible, porous, dissolvable sheet, which is another type of anti-gravity arrangement according to another embodiment of the present invention. Specifically, a feeding trough 60 is filled with an aerated wet pre-mixture 61. A heated rotatable cylinder 70 (also referred to as a drum dryer) is placed above said feeding trough 60. Said heated drum dryer 70 has a cylindrical heated outer surface characterized by a controlled surface temperature of about 130° C., and it rotates along a clock-wise direction (as shown by the thin curved line with an arrowhead) to pick up the aerated wet pre-mixture 61 from the feeding trough 60. The aerated wet pre-mixture 61 forms a thin sheet 62 over the cylindrical heated outer surface of the drum dryer 70, which rotates and dries such sheet 62 of aerated wet pre-mixture in approximately 10-15 minutes. A leveling blade (not shown) may be placed near the slurry pick-up location to ensure a consistent thickness of the sheet 62 so formed, although it is possible to control the thickness of sheet 62 simply by modulating the viscosity of the aerated wet pre-mixture 61 and the rotating speed and surface temperature of the drum dryer 70. Once dried, the sheet 62 can then picked up, either manually or by a scraper 72 at the end of the drum rotation.

As shown in FIG. 5, the sheet 62 formed by the aerated wet pre-mixture 61 comprises a first side 62A (i.e., the bottom side) that directly contacts the heated outer surface of the heated drum dryer 70 and an opposing second side 62B (i.e., the top side). Correspondingly, heat from the drum dryer 70 is conducted to the sheet 62 along an outward heating direction, to heat the first side 62A (the bottom side) of the sheet 62 first and then the opposing second side 62B (the top side). Such outward heating direction forms a temperature gradient in the sheet 62 that decreases from the first side 62A (the bottom side) to the opposing second side 62B (the top side). The outward heating direction is slowly and constantly changing as the drum dryer 70 rotates, but along a very clear and predictable path (as shown by the multiple outwardly extending cross-hatched arrowheads in FIG. 5). The relative position of the outward heating direction and the gravitational direction (as shown by the white arrowhead) is also slowing and constantly changing in a similar clear and predictable manner. For less than half of the drying time (i.e., when the heating direction is below the horizontal dashed line), the outward heating direction is substantially aligned with the gravitational direction with an offset angle of less than 90° in between. During majority of the drying time (i.e., when the heating direction is flushed with or above the horizontal dashed line), the outward heating direction is opposite or substantially opposite to the gravitational direction with an offset angle of 90° or more therebetween. Depending on the initial "start" coating position of the sheet 62, the heating direction can be opposite or substantially opposite to the gravitational direction for more than 55% of the drying time (if the coating starts at the very bottom of the drum dryer 70), preferably more than 60% of the drying time (if the coating starts at a higher position of the drum dryer 70, as shown in FIG. 5). Consequently, during most of the drying step this slowing rotating and changing heating direction in the rotary drum-based heating/drying arrangement can still function to limit and "counter-act"/reduce the liquid drainage in sheet 62 caused by the gravitational force, resulting in improved OCF structures in the sheet so formed. The resulting sheet as dried by the heated drum dryer 70 is also characterized by a less dense bottom region with numerous more evenly sized pores, and a top surface with relatively larger pore openings. Moreover, the resulting sheet has a more evenly distributed overall pore sizes throughout different regions (e.g., top, middle, bottom) thereof.

In addition to employing the improved heating direction (i.e., in a substantially offset relation with respect to the gravitational direction) as mentioned hereinabove, it may also be desirable and even important to carefully adjust the viscosity and/or solid content of the wet pre-mixture, the amount and speed of aeration (air feed pump speed, mixing head speed, air flow rate, density of the aerated pre-mixture and the like, which may affect bubble sizes and quantities in the aerated pre-mixture and correspondingly impact the pore size/distribution/quantity/characteristics in the solidified sheet), the drying temperature and the drying time, in order to achieve optimal OCF structure in the resulting sheet according to the present invention.

More detailed descriptions of the processes for making the flexible, porous, dissolvable sheets, as well as the physical and chemical characteristics of such sheets, are provided in the ensuring sections.

IV. Process of Making Solid Sheets

The present invention proposes to make flexible, porous, dissolvable solid sheets by the steps of: (a) forming a wet pre-mixture containing raw materials (e.g., the PVA polymer or copolymer, the surfactants, and optionally the plasticizer and any other active ingredients) dissolved or dispersed in water or a suitable solvent, which is characterized by a viscosity of from about 1,000 cps to about 25,000 cps measured at about 40° C. and 1 $s^{-1}$; (b) aerating said wet pre-mixture (e.g., by introducing a gas into the wet slurry) to form an aerated wet pre-mixture; (c) forming said aerated wet pre-mixture into a sheet having opposing first and second sides; and (d) drying said formed sheet for a drying time of from 1 minute to 60 minutes at a temperature from 70° C. to 200° C., preferably along a heating direction that forms a temperature gradient decreasing from the first side to the second side of said formed sheet, wherein the heating direction is substantially offset from the gravitational direction for more than half of the drying time, i.e., the drying step is conducted under heating along a mostly "anti-gravity" heating direction. Such a mostly "anti-gravity" heating direction can be achieved by various means, which include but are not limited to the bottom conduction-based heating/drying arrangement and the rotary drum based heating/drying arrangement, as illustrated hereinabove in FIGS. 4 and 5 respectively.

Step (A): Preparation of Wet Pre-Mixture

The wet pre-mixture of the present invention is generally prepared by mixing solids of interest, including the PVA polymer or copolymer, the surfactants, the optional plasticizer, and any other active ingredients, with a sufficient amount of water or another solvent in a pre-mix tank. The wet pre-mixture can be formed using a mechanical mixer. Mechanical mixers useful herein, include, but aren't limited to pitched blade turbines or MAXBLEND mixer (Sumitomo Heavy Industries).

It is particularly important in the present invention to adjust viscosity of the wet pre-mixture so that it is within a predetermined range of from about 1,000 cps to about 25,000 cps when measured at 40° C. and 1 $s^{-1}$. Viscosity of the wet pre-mixture has a significant impact on the pore expansion and pore opening of the aerated pre-mixture during the subsequent drying step, and wet pre-mixtures with different viscosities may form flexible, porous, dissolvable solid sheets of very different foam structures. On one hand, when the wet pre-mixture is too thick/viscous (e.g., having a viscosity higher than about 25,000 cps as measured at 40° C. and 1 $s^{-1}$), aeration of such wet pre-mixture may become more difficult. More importantly, interstitial liquid drainage from thin film bubble facings into the plateau borders of the three-dimensional foam during the sub sequent drying step may be adversely affected or significantly limited. The interstitial liquid drainage during drying is believed to be critical for enabling pore expansion and pore opening in the aerated wet pre-mixture during the subsequent drying step. As a result, the flexible, porous, dissolvable solid sheet so formed thereby may have significantly smaller pores and less interconnectivity between the pores (i.e., more "closed" pores than open pores), which render it harder for water to ingress into and egress from such sheet. On the other hand, when the wet pre-mixture is too thin/running (e.g., having a viscosity lower than about 1,000 cps as measured at 40° C. and 1 $s^{-1}$), the aerated wet pre-mixture may not be sufficiently stable, i.e., the air bubbles may rupture, collapse, or coalescence too quickly in the wet pre-mixture after aeration and before drying. Consequently, the resulting solid sheet may be much less porous and more dense than desired.

In one embodiment, viscosity of the wet pre-mixture ranges from about 3,000 cps to about 24,000 cps, preferably from about 5,000 cps to about 23,000 cps, more preferably from about 10,000 cps to about 20,000 cps, as measured at 40° C. and 1 $sec^{-1}$. The pre-mixture viscosity values are measured using a Malvern Kinexus Lab+ rheometer with cone and plate geometry (CP1/50 SR3468 SS), a gap width of 0.054 mm, a temperature of 40° C. and a shear rate of 1.0 reciprocal seconds for a period of 360 seconds.

In a preferred but not necessary embodiment, the solids of interest are present in the wet pre-mixture at a level of from about 15% to about 70%, preferably from about 20% to about 50%, more preferably from about 25% to about 45% by total weight of said wet pre-mixture. The percent solid content is the summation of the weight percentages by weight of the total processing mixture of all solid components, semi-solid components and liquid components excluding water and any obviously volatile materials such as low boiling alcohols. On one hand, if the solid content in the wet pre-mixture is too high, viscosity of the wet pre-mixture may increase to a level that will prohibit or adversely affect interstitial liquid drainage and prevent formation of the desired predominantly open-celled porous solid structure as described herein. On the other hand, if the solid content in the wet pre-mixture is too low, viscosity of the wet pre-mixture may decrease to a level that will cause bubble rupture/collapse/coalescence and more percent (%) shrinkage of the pore structures during drying, resulting in a solid sheet that is significantly less porous and denser.

Among the solids of interest in the wet pre-mixture of the present invention, there may be present from about 10% to about 75% surfactants, from about 0.1% to about 25% PVA polymer or copolymer, and optionally from about 0.1% to about 25% plasticizer, by total weight of the solids. Other actives or benefit agents can also be added into the pre-mixture.

Preferably, the wet pre-mixture used comprises from about 3% to about 20% by weight of said wet pre-mixture of PVA, in one embodiment from about 5% to about 15% by weight of the wet pre-mixture of PVA, in one embodiment from about 7% to about 10% by weight of the wet pre-mixture of PVA.

More preferably, the wet pre-mixture comprises from about 10% to about 40% by weight of the wet pre-mixture of surfactant(s), in one embodiment from about 12% to about 35% by weight of the wet pre-mixture of surfactant(s), in one embodiment from about 15% to about 30% by weight of the wet pre-mixture of surfactant(s).

Still more preferably, the wet pre-mixture comprises from about 0.02% to about 20% by weight of said wet pre-mixture of a plasticizer, in one embodiment from about 0.1% to about 10% by weight of said wet pre-mixture of a plasticizer, in one embodiment from about 0.5% to about 5% by weight of the wet pre-mixture of a plasticizer.

Optionally, the wet pre-mixture is pre-heated immediately prior to and/or during the aeration process at above ambient temperature but below any temperatures that would cause degradation of the components therein. In one embodiment, the wet pre-mixture is kept at an elevated temperature ranging from about 40° C. to about 100° C., preferably from about 50° C. to about 95° C., more preferably from about 60° C. to about 90° C., most preferably from about 75° C. to about 85° C. In one embodiment, the optional continuous heating is utilized before the aeration step. Further, additional heat can be applied during the aeration process to try and maintain the wet pre-mixture at such an elevated temperature. This can be accomplished via conductive heating from one or more surfaces, injection of steam or other processing means. It is believed that the act of pre-heating the wet pre-mixture before and/or during the aeration step may provide a means for lowering the viscosity of pre-mixtures comprising higher percent solids content for improved introduction of bubbles into the mixture and formation of the desired solid sheet. Achieving higher percent solids content is desirable since it may reduce the overall energy requirements for drying. The increase of percent solids may therefore conversely lead to a decrease in water level content and an increase in viscosity. As mentioned hereinabove, wet pre-mixtures with viscosities that are too high are undesirable for the practice of the present invention. Pre-heating may effectively counteract such viscosity increase and thus allow for the manufacture of a fast dissolving sheet even when using high solid content pre-mixtures.

Step (B): Aeration of Wet Pre-Mixture

Aeration of the wet pre-mixture is conducted in order to introduce a sufficient amount of air bubbles into the wet pre-mixture for subsequent formation of the OCF structures therein upon drying. Once sufficiently aerated, the wet pre-mixture is characterized by a density that is significantly lower than that of the non-aerated wet pre-mixture (which may contain a few inadvertently trapped air bubbles) or an insufficiently aerated wet pre-mixture (which may contain some bubbles but at a much lower volume percentage and of significantly larger bubble sizes). Preferably, the aerated wet pre-mixture has a density ranging from about 0.05 g/ml to about 0.5 g/ml, preferably from about 0.08 g/ml to about 0.4 g/ml, more preferably from about 0.1 g/ml to about 0.35 g/ml, still more preferably from about 0.15 g/ml to about 0.3 g/ml, most preferably from about 0.2 g/ml to about 0.25 g/ml.

Aeration can be accomplished by either physical or chemical means in the present invention. In one embodiment, it can be accomplished by introducing a gas into the wet pre-mixture through mechanical agitation, for example, by using any suitable mechanical processing means, including but not limited to: a rotor stator mixer, a planetary mixer, a pressurized mixer, a non-pressurized mixer, a batch mixer, a continuous mixer, a semi-continuous mixer, a high shear mixer, a low shear mixer, a submerged sparger, or any combinations thereof. In another embodiment, it may be achieved via chemical means, for example, by using chemical foaming agents to provide in-situ gas formation via chemical reaction of one or more ingredients, including formation of carbon dioxide ($CO_2$ gas) by an effervescent system.

In a particularly preferred embodiment, it has been discovered that the aeration of the wet pre-mixture can be cost-effectively achieved by using a continuous pressurized aerator or mixer that is conventionally utilized in the foods industry in the production of marshmallows. Continuous pressurized mixers may work to homogenize or aerate the wet pre-mixture to produce highly uniform and stable foam structures with uniform bubble sizes. The unique design of the high shear rotor/stator mixing head may lead to uniform bubble sizes in the layers of the open celled foam. Suitable continuous pressurized aerators or mixers include the Morton whisk (Morton Machine Co., Motherwell, Scotland), the Oakes continuous automatic mixer (E.T. Oakes Corporation, Hauppauge, New York), the Fedco Continuous Mixer (The Peerless Group, Sidney, Ohio), the Mondo (Haas-Mondomix B.V., Netherlands), the Aeros (Aeros Industrial Equipment Co., Ltd., Guangdong Province, China), and the Preswhip (Hosokawa Micron Group, Osaka, Japan). For example, an Aeros A20 continuous aerator can be operated at a feed pump speed setting of about 300-800 (preferably at about 500-700) with a mixing head speed setting of about 300-800 (preferably at about 400-600) and an air flow rate of about 50-150 (preferably 60-130, more preferably 80-120) respectively. For another example, an Oakes continuous automatic mixer can be operated at a mixing head speed setting of about 10-30 rpm (preferably about 15-25 rpm, more preferably about 20 rpm) with an air flow rate of about 10-30 Litres per hour (preferably about 15-25 L/hour, more preferably about 19-20 L/hour).

In another specific embodiment, aeration of the wet pre-mixture can be achieved by using the spinning bar that is a part of the rotary drum dryer, more specifically a component of the feeding trough where the wet pre-mixture is stored before it is coated onto the heated outer surface of the drum dryer and dried. The spinning bar is typically used for stirring the wet pre-mixture to preventing phase separation or sedimentation in the feeding trough during the waiting time before it is coated onto the heated rotary drum of the drum dryer. In the present invention, it is possible to operate such spinning bar at a rotating speed ranging from about 150 to about 500 rpm, preferably from about 200 to about 400 rpm, more preferably from about 250 to about 350 rpm, to mix the wet pre-mixture at the air interface and provide sufficient mechanical agitation needed for achieving the desired aeration of the wet pre-mixture.

As mentioned hereinabove, the wet pre-mixture can be maintained at an elevated temperature during the aeration process, so as to adjust viscosity of the wet pre-mixture for optimized aeration and controlled draining during drying.

For example, when aeration is achieved by using the spinning bar of the rotary drum, the aerated wet pre-mixture in the feeding trough is typically maintained at about 60° C. during initial aeration by the spinning bar (while the rotary drum is stationary), and then heated to about 70° C. when the rotary drum is heated up and starts rotating.

Bubble size of the aerated wet pre-mixture assists in achieving uniform layers in the OCF structures of the resulting solid sheet. In one embodiment, the bubble size of the aerated wet pre-mixture is from about 5 to about 100 microns; and in another embodiment, the bubble size is from about 20 microns to about 80 microns. Uniformity of the bubble sizes causes the resulting solid sheets to have consistent densities.

Step (C): Sheet-Forming

After sufficient aeration, the aerated wet pre-mixture forms one or more sheets with opposing first and second sides. The sheet-forming step can be conducted in any suitable manners, e.g., by extrusion, casting, molding, vacuum-forming, pressing, printing, coating, and the like. More specifically, the aerated wet pre-mixture can be formed into a sheet by: (i) casting it into shallow cavities or trays or specially designed sheet moulds; (ii) extruding it onto a continuous belt or screen of a dryer; (iii) coating it onto the outer surface of a rotary drum dryer. Preferably, the supporting surface upon which the sheet is formed is formed by or coated with materials that are anti-corrosion, non-interacting and/or non-sticking, such as metal (e.g., steel, chromium, and the like), TEFLON®, polycarbonate, NEOPRENE®, HDPE, LDPE, rubber, glass and the like.

Preferably, the formed sheet of aerated wet pre-mixture has a thickness ranging from a thickness ranging from 0.5 mm to 4 mm, preferably from 0.6 mm to 3.5 mm, more preferably from 0.7 mm to 3 mm, still more preferably from 0.8 mm to 2 mm, most preferably from 0.9 mm to 1.5 mm. Controlling the thickness of such formed sheet of aerated wet pre-mixture may be important for ensuring that the resulting solid sheet has the desired OCF structures. If the formed sheet is too thin (e.g., less than 0.5 mm in thickness), many of the air bubbles trapped in the aerated wet pre-mixture will expand during the subsequent drying step to form through-holes that extend through the entire thickness of the resulting solid sheet. Such through-holes, if too many, may significantly compromise both the overall structural integrity and aesthetic appearance of the sheet. If the formed sheet is too thick, not only it will take longer to dry, but also it will result in a solid sheet with greater pore size variations between different regions (e.g., top, middle, and bottom regions) along its thickness, because the longer the drying time, the more imbalance of forces may occur through bubble rupture/collapse/coalescence, liquid drainage, pore expansion, pore opening, water evaporation, and the like.

More importantly, it is easier to assembly multiple layers of relatively thin sheets into the multilayer structures of the present invention with the desired Aspect Ratio, while still providing satisfactory pore structures for fast dissolution as well as ensuring efficient drying within a relatively short drying time.

Step (D): Drying Under Anti-Gravity Heating

Preferably but not necessarily, the present invention employs an anti-gravity heating direction during the drying step, either through the entire drying time or at least through more than half of the drying time. Without being bound by any theory, it is believed that such anti-gravity heating direction may reduce or counteract excessive interstitial liquid drainage toward the bottom region of the formed sheet during the drying step. Further, because the top surface is dried last, it allows longer time for air bubbles near the top surface of the formed sheet to expand and form pore openings on the top surface (because once the wet matrix is dried, the air bubbles can no longer expand or form surface openings). Consequently, the solid sheet formed by drying with such anti-gravity heating is characterized by improved OCF structures that enables faster dissolution as well as other surprising and unexpected benefits.

In a specific embodiment, the anti-gravity heating direction is provided by a conduction-based heating/drying arrangement, either the same or similar to that illustrated by FIG. 4. For example, the aerated wet pre-mixture can be casted into a mold to form a sheet with two opposing sides. The mold can then be placed on a hot plate or a heated moving belt or any other suitable heating device with a planar heated surface characterized by a controlled surface temperature of from about 80° C. to about 170° C., preferably from about 90° C. to about 150° C., more preferably from about 100° C. to about 140° C. Thermal energy is transferred from the planar heated surface to the bottom surface of the sheet of aerated wet pre-mixture via conduction, so that solidification of the sheet starts with the bottom region and gradually moves upward to reach the top region last. In order to ensure that the heating direction is primarily anti-gravity (i.e., substantially offset from the gravitational direction) during this process, it is preferred that the heated surface is a primary heat source for said sheet during drying. If there are any other heating sources, the overall heating direction may change accordingly. More preferably, the heated surface is the only heat source for said sheet during drying.

In another specific embodiment, the anti-gravity heating direction is provided by a rotary drum-based heating/drying arrangement, which is also referred to as drum drying or roller drying similar to that illustrated in FIG. 5. Drum drying is one type of contact-drying methods, which is used for drying out liquids from a viscous pre-mixture of raw materials over the outer surface of a heated rotatable drum (also referred to as a roller or cylinder) at relatively low temperatures to form sheet-like articles. It is a continuous drying process particularly suitable for drying large volumes. Because the drying is conducted at relatively low temperatures via contact-heating/drying, it normally has high energy efficiency and does not adversely affect the compositional integrity of the raw materials.

The heated rotatable cylinder used in drum drying is heated internally, e.g., by steam or electricity, and it is rotated by a motorized drive installed on a base bracket at a predetermined rotational speed. The heated rotatable cylinder or drum preferably has an outer diameter ranging from about 0.5 meters to about 10 meters, preferably from about 1 meter to about 5 meters, more preferably from about 1.5 meters to about 2 meters. It may have a controlled surface temperature of from about 80° C. to about 170° C., preferably from about 90° C. to about 150° C., more preferably from about 100° C. to about 140° C. Further, such heated rotatable cylinder is rotating at a speed of from about 0.005 rpm to about 0.25 rpm, preferably from about 0.05 rpm to about 0.2 rpm, more preferably from about 0.1 rpm to about 0.18 rpm.

Said heated rotatable cylinder is preferably coated with a non-stick coating on its outer surface. The non-stick coating may be overlying on the outer surface of the heated rotatable drum, or it can be fixed to a medium of the outer surface of the heated rotatable drum. The medium includes, but is not limited to, heat-resisting non-woven fabrics, heat-resisting carbon fiber, heat-resisting metal or non-metallic mesh and the like. The non-stick coating can effectively preserve structural integrity of the sheet-like article from damage during the sheet-forming process.

There is also provided a feeding mechanism on the base bracket for adding the aerated wet pre-mixture of raw materials as described hereinabove onto the heated rotatable drum, thereby forming a thin layer of the viscous pre-mixture onto the outer surface of the heated rotatable drum. Such thin layer of the pre-mixture is therefore dried by the heated rotatable drum via contact-heating/drying. The feeding mechanism includes a feeding trough installed on the base bracket, while said feeding trough has installed thereupon at least one (preferably two) feeding hopper(s), an imaging device for dynamic observation of the feeding, and an adjustment device for adjusting the position and inclination angle of the feeding hopper. By using said adjustment device to adjust the distance between said feeding hopper and the outer surface of the heated rotatable drum, the need for different thicknesses of the formed sheet-like article can be met. The adjustment device can also be used to adjust the feeding hopper to different inclination angles so as to meet the material requirements of speed and quality. The feeding trough may also include a spinning bar for stirring the wet pre-mixture therein to avoid phase separation and sedimentation before the wet pre-mixture is coated onto the outer surface of the heated rotatable cylinder. Such spinning bar, as mentioned hereinbefore, can also be used to aerate the wet pre-mixture as needed.

There may also be a heating shield installed on the base bracket, to prevent rapid heat lost. The heating shield can also effectively save energy needed by the heated rotatable drum, thereby achieving reduced energy consumption and provide cost savings. The heating shield is a modular assembly structure, or integrated structure, and can be freely detached from the base bracket. A suction device is also installed on the heating shield for sucking the hot steam, to avoid any water condensate falling on the sheet-like article that is being formed.

There may also be an optional static scraping mechanism installed on the base bracket, for scraping or scooping up the sheet-like article already formed by the heated rotatable drum. The static scraping mechanism can be installed on the base bracket, or on one side thereof, for transporting the already formed sheet-like article downstream for further processing. The static scraping mechanism can automatically or manually move close and go away from the heated rotatable drum.

The making process of the flexible, porous, dissolvable solid structure article of the present invention is as follows. Firstly, the heated rotatable drum with the non-stick coating on the base bracket is driven by the motorized drive. Next, the adjustment device adjusts the feeding mechanism so that the distance between the feeding hopper and the outer surface of the heated rotatable drum reaches a preset value. Meanwhile, the feeding hopper adds the aerated wet pre-mixture containing all or some raw materials for making the flexible, porous, dissolvable solid structure article onto an outer surface of the heated rotatable drum, to form a thin layer of said aerated wet pre-mixture thereon with the desired thickness as described hereinabove in the preceding section. Optionally, the suction device of the heating shield sucks the hot steam generated by the heated rotatable drum. Next, the static scraping mechanism scrapes/scoops up a dried/solidified sheet, which is formed by the thin layer of aerated wet pre-mixture after it is dried by the heated rotatable drum at a relatively low temperature (e.g., 130° C.). The dried/solidified sheet can also be manually or automatically peeled off, without such static scraping mechanism and then rolled up by a roller bar.

The total drying time in the present invention depends on the formulations and solid contents in the wet pre-mixture, the drying temperature, the thermal energy influx, and the thickness of the sheet material to be dried. Preferably, the drying time is from about 1 minute to about 60 minutes, preferably from about 2 minutes to about 30 minutes, more preferably from about 2 to about 15 minutes, still more preferably from about 2 to about 10 minutes, most preferably from about 2 to about 5 minutes.

During such drying time, the heating direction is so arranged that it is substantially opposite to the gravitational direction for more than half of the drying time, preferably for more than 55% or 60% of the drying time (e.g., as in the rotary drum-based heating/drying arrangement described hereinabove), more preferably for more than 75% or even 100% of the drying time (e.g., as in the bottom conduction-based heating/drying arrangement described hereinabove). Further, the sheet of aerated wet pre-mixture can be dried under a first heating direction for a first duration and then under a second, opposite heating direction under a second duration, while the first heating direction is substantially opposite to the gravitational direction, and while the first duration is anywhere from 51% to 99% (e.g., from 55%, 60%, 65%, 70% to 80%, 85%, 90% or 95%) of the total drying time. Such change in heating direction can be readily achieved by various other arrangements not illustrated herein, e.g., by an elongated heated belt of a serpentine shape that can rotate along a longitudinal central axis.

V. Physical Characteristics of Solid Sheets

The flexible, porous, dissolvable solid sheet formed by the above-described processing steps, especially by using an antigravity heating/drying arrangement, may be characterized by improved pore structures that allows easier water ingress into the sheet and faster dissolution of the sheet in water. Such improved pore structures can be readily achieved by adjusting various processing conditions as described hereinabove.

In general, such solid sheet may be characterized by: (i) a Percent Open Cell Content of from about 80% to 100%, preferably from about 85% to 100%, more preferably from about 90% to 100%, as measured by the Test 3 hereinafter; and (ii) an Overall Average Pore Size of from about 100 μm to about 2000 μm, preferably from about 150 μm to about 1000 μm, more preferably from about 200 μm to about 600 μm, as measured by the Micro-CT method described in Test 2 hereinafter. The Overall Average Pore Size defines the porosity of the OCF structure of the present invention. The Percent Open Cell Content defines the interconnectivity between pores in the OCF structure of the present invention. Interconnectivity of the OCF structure may also be described by a Star Volume or a Structure Model Index (SMI) as disclosed in WO2010077627 and WO2012138820.

Figure 6B:
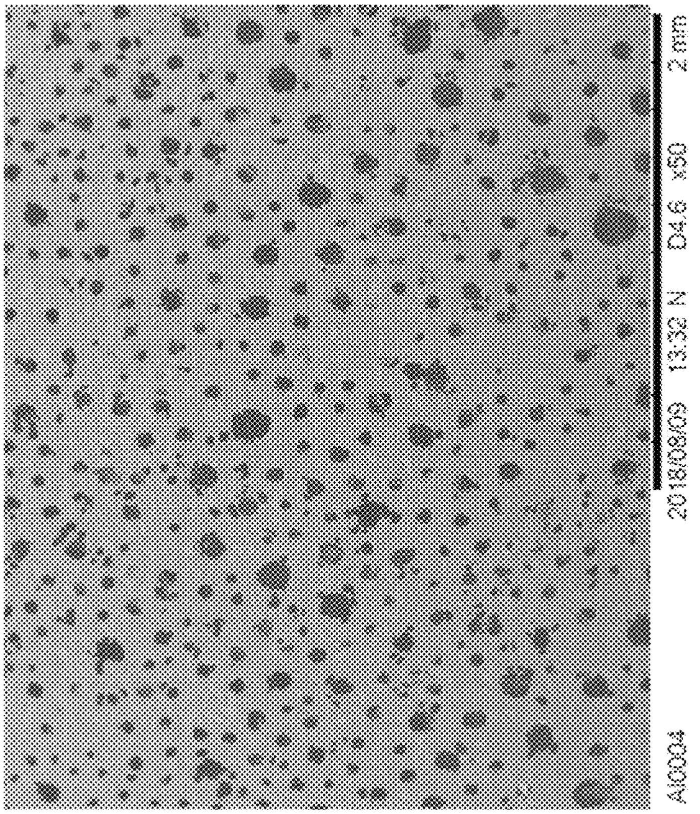
FIG. 6B shows a SEM image of the top surface of a second flexible, porous, dissolvable sheet containing the same ingredients as the sheet shown in FIG. 6A, but which is made by a process employing an impingement oven-based heating/drying arrangement.
Figure 6A:
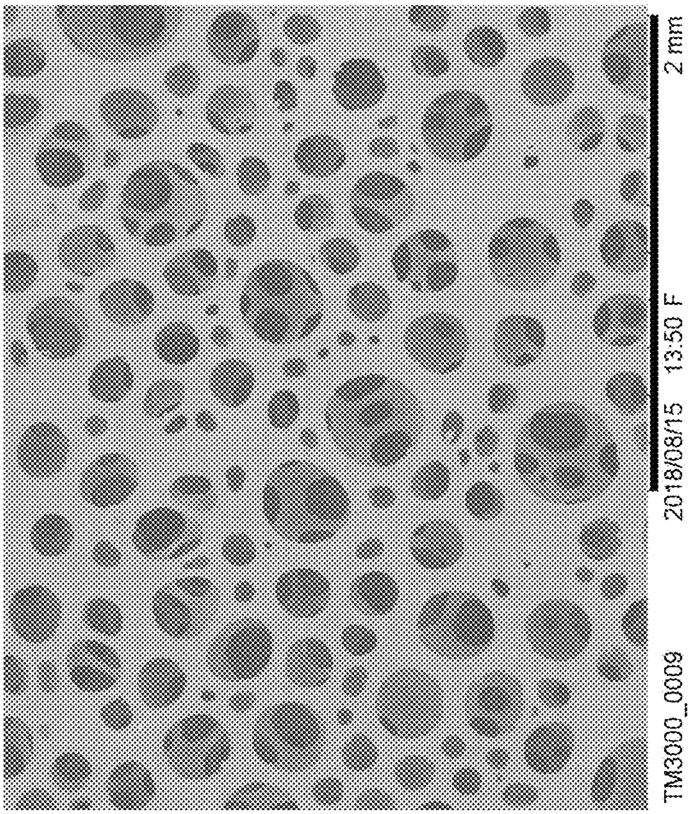
FIG. 6A shows a SEM image of the top surface of a first flexible, porous, dissolvable sheet, which is made by a process employing a rotary drum-based heating/drying arrangement.

The solid sheet of the present invention has opposing top and bottom surfaces, while its top surface is preferably characterized by a Surface Average Pore Diameter that is greater than about 100 μm, more preferably greater than about 110 μm, still more preferably greater than about 120 μm, still more preferably greater than about 130 μm, most preferably greater than about 150 μm, as measured by the SEM method described in Test 1 hereinafter. When comparing with solid sheets formed by the non-anti-gravity heating/drying arrangements (e.g., the convection-based, the microwave-based, or the impingement oven-based arrangements), the solid sheet formed by the anti-gravity heating/drying arrangement (e.g., the bottom conduction-based or the rotary drum based arrangements) has a significantly larger Surface Average Pore Diameter at its top surface (as demonstrated by FIGS. 6A-6B, which are described in detail in Example 2 hereinafter), because under the antigravity heating, the top surface of the formed sheet of aerated wet pre-mixture is the last to dry/solidify, and the air bubbles near the top surface has the longest time to expand and form larger pore openings at the top surface.

Still further, the solid sheet formed by the anti-gravity heating/drying arrangement described herein may be characterized by a more uniform pore size distribution between different regions along its thickness direction, in comparison with the sheets formed by the non-anti-gravity heating/drying arrangements. Specifically, the solid sheet formed by the anti-gravity heating/drying arrangement comprises a top region adjacent to the top surface, a bottom region adjacent to the bottom surface, and a middle region therebetween, while the top, middle, and bottom regions all have the same thickness. Each of the top, middle and bottom regions of such solid sheet is characterized by an Average Pore Size, while the ratio of Average Pore Size in the bottom region over that in the top region (i.e., bottom-to-top Average Pore Size ratio) is from about 0.6 to about 1.5, preferably from about 0.7 to about 1.4, preferably from about 0.8 to about 1.3, more preferably from about 1 to about 1.2. In comparison, a solid sheet formed by the impingement oven-based heating/drying arrangement may have a bottom-to-top Average Pore Size ratio of more than 1.5, typically about 1.7-2.2 (as demonstrated in Example 2 hereinafter). Moreover, the solid sheet formed by the anti-gravity heating/drying arrangement may be characterized by a bottom-to-middle Average Pore Size ratio of from about 0.5 to about 1.5, preferably from about 0.6 to about 1.3, more preferably from about 0.8 to about 1.2, most preferably from about 0.9 to about 1.1, and a middle-to-top Average Pore Size ratio of from about 1 to about 1.5, preferably from about 1 to about 1.4, more preferably from about 1 to about 1.2.

Still further, the relative standard deviation (RSTD) between Average Pore Sizes in the top, middle and bottom regions of the solid sheet formed by the anti-gravity heating/drying arrangement is no more than 20%, preferably no more than 15%, more preferably no more than 10%, most preferably no more than 5%. In contrast, a solid sheet formed by the impingement oven-based heating/drying arrangement may have a relative standard deviation (RSTD) between top/middle/bottom Average Pore Sizes of more than 20%, likely more than 25% or even more than 35% (as demonstrated in Example 2 hereinafter).

Preferably, the solid sheet of the present invention is further characterized by an Average Cell Wall Thickness of from about 5 μm to about 200 μm, preferably from about 10 μm to about 100 μm, more preferably from about 10 μm to about 80 μm, as measured by Test 2 hereinafter.

The solid sheet of the present invention may contain a small amount of water. Preferably, it is characterized by a final moisture content of from 0.5% to 25%, preferably from 1% to 20%, more preferably from 3% to 10%, by weight of said solid sheet, as measured by Test 4 hereinafter. An appropriate final moisture content in the resulting solid sheet may ensure the desired flexibility/deformability of the sheet, as well as providing soft/smooth sensory feel to the consumers. If the final moisture content is too low, the sheet may be too brittle or rigid. If the final moisture content is too high, the sheet may be too sticky, and its overall structural integrity may be compromised.

The solid sheet of the present invention may have a thickness ranging from about 0.6 mm to about 3.5 mm, preferably from about 0.7 mm to about 3 mm, more preferably from about 0.8 mm to about 2 mm, most preferably from about 1 mm to about 1.5 mm. Thickness of the solid sheet can be measured using Test 5 described hereinafter. The solid sheet after drying may be slightly thicker than the sheet of aerated wet pre-mixture, due to pore expansion that in turn leads to overall volume expansion.

The solid sheet of the present invention may further be characterized by a basis weight of from about 50 grams/$m^2$ to about 250 grams/$m^2$, preferably from about 80 grams/$m^2$ to about 220 grams/$m^2$, more preferably from about 100 grams/$m^2$ to about 200 grams/$m^2$, as measured by Test 6 described hereinafter.

Still further, the solid sheet of the present invention may have a density ranging from about 0.05 grams/$cm^3$ to about 0.5 grams/$cm^3$, preferably from about 0.06 grams/$cm^3$ to about 0.4 grams/$cm^3$, more preferably from about 0.07 grams/$cm^3$ to about 0.2 grams/$cm^3$, most preferably from about 0.08 grams/$cm^3$ to about 0.15 grams/$cm^3$, as measured by Test 7 hereinafter. Density of the solid sheet of the present invention is lower than that of the sheet of aerated wet pre-mixture, also due to pore expansion that in turn leads to overall volume expansion.

Furthermore, the solid sheet of the present invention can be characterized by a Specific Surface Area of from about 0.03 $m^2$/g to about 0.25 $m^2$/g, preferably from about 0.04 $m^2$/g to about 0.22 $m^2$/g, more preferably from 0.05 $m^2$/g to 0.2 $m^2$/g, most preferably from 0.1 $m^2$/g to 0.18 $m^2$/g, as measured by Test 8 described hereinafter. The Specific Surface Area of the solid sheet of the present invention may be indicative of its porosity and may impact its dissolution rate, e.g., the greater the Specific Surface Area, the more porous the sheet and the faster its dissolution rate.

VI. Assembling of Multiple Sheets into Multilayer Dissolvable Solid Articles

Once the flexible, dissolvable, porous solid sheets as described hereinabove is formed, as described hereinabove, two or more of such sheets can be further assembled together to form multilayer dissolvable solid articles. Such multilayer dissolvable solid articles may have any desirable three-dimensional shapes, including but not limited to: spherical, cubic, rectangular, polygonal, oblong, cylindrical, rod, sheet, flower-shaped, fan-shaped, star-shaped, disc-shaped, and the like. The sheets can be combined and/or treated by any means known in the art, examples of which include but are not limited to, chemical means, mechanical means, and combinations thereof. Such combination and/or treatment steps are hereby collectively referred to as a "conversion" process, i.e., which functions to convert two or more flexible, dissolvable, porous sheets of the present invention into a dissolvable solid article with a desired three-dimensional shape.

It has been a surprising and unexpected discovery of the present invention that three-dimensional (3-D) multilayer structures formed by stacking multiple layers of flexible, dissolvable, porous solid sheets of the present invention (which have an open cell foam or OCF structure defined by a Percent Open Cell Content of from about 80% to 100% and an Overall Average Pore Size of from about 100 μm to about 2000 μm) together are more dissolvable than a single-layer structure that has the same aspect ratio. This allows significant extension of the resulting multilayer structures along the thickness direction, to create three-dimensional product shapes that are easier to handle and more aesthetically pleasing to the consumers (e.g., products in form of thick pads or even cubes).

Specifically, the multilayer dissolvable solid article of the present invention, which is formed by stacking multiple layers of the above-described flexible, dissolvable, porous sheets together is characterized by a maximum dimension D and a minimum dimension z (which is perpendicular to the maximum dimension D), while the ratio of D/z (hereinafter also referred to as the "Aspect Ratio") ranges from 1 to about 10, preferably from about 1.4 to about 9, preferably from about 1.5 to about 8, more preferably from about 2 to about 7.

The multilayer dissolvable solid article of the present invention can be of any suitable shape, either regular or irregular, e.g., spherical, cubic, rectangular, polygonal, oblong, cylindrical, rod, sheet, flower-shaped, fan-shaped, star-shaped, disc-shaped, and the like. When the Aspect Ratio is 1, the dissolvable solid article has a spherical shape. When the Aspect Ratio is about 1.4, the dissolvable solid article has a cubical shape.

The multilayer dissolvable solid article of the present invention may have a minimal dimension z that is greater than about 3 mm but less than about 20 cm, preferably from about 4 mm to about 10 cm, more preferably from about 5 mm to about 30 mm.

The above-described multilayer dissolvable solid article may comprise more than two of such flexible, dissolvable, porous sheets. For example, it may comprise from about 4 to about 50, preferably from about 5 to about 40, more preferably from about 6 to about 30, of said flexible, dissolvable, porous sheets. The improved OCF structures in the flexible, dissolvable, porous sheets made according to the present invention allow stacking of many sheets (e.g., 15-40) together, while still providing a satisfactory overall dissolution rate for the stack. In a particularly preferred embodiment of the present invention, the multilayer dissolvable solid article comprises from 15 to 40 layers of the above-described flexible, dissolvable, porous sheets and has an aspect ratio ranging from about 2 to about 7.

The multilayer dissolvable solid article of the present invention may comprise individual sheets of different colors, which are visual from an external surface (e.g., one or more side surfaces) of such article. Such visible sheets of different colors are aesthetically pleasing to the consumers. Further, the different colors of individual sheets may provide visual cues indicative of different benefit agents contained in the individual sheets. For example, the multilayer dissolvable solid article may comprise a first sheet that has a first color and contains a first benefit agent and a second sheet that has a second color and contains a second benefit, while the first color provides a visual cue indicative of the first benefit agent, and while the second color provides a visual cue indicative of the second benefit agent.

Further, one or more functional ingredients can be "sandwiched" between individual sheets of the multilayer dissolvable solid article as described hereinabove, e.g., by spraying, sprinkling dusting, coating, spreading, dipping, injecting, or even vapor deposition. In order to avoid interference of such functional ingredients with the cutting seal or edge seal near the peripherals of the individual sheets, it is preferred that such functional ingredients are located within a central region between two adjacent sheets, which is defined as a region that is spaced apart from the peripherals of such adjacent sheets by a distance that is at least 10% of the maximum Dimension D.

Suitable functional ingredients can be selected from the group consisting of cleaning actives (surfactants, free perfumes, encapsulated perfumes, perfume microcapsules, silicones, softening agents, enzymes, bleaches, colorants, builders, rheology modifiers, pH modifiers, and combinations thereof) and personal care actives (e.g., emollients, humectants, conditioning agents, and combinations thereof).

TEST METHODS

Test 1: Scanning Electron Microscopic (SEM) Method for Determining Surface Average Pore Diameter of the Sheet Article An Hitachi TM3000 Tabletop Microscope (S/N: 123104-04) is used to acquire SEM micrographs of samples. Samples of the solid sheet articles of the present invention are approximately 1 cm×1 cm in area and cut from larger sheets. Images are collected at a magnification of 50×, and the unit is operated at 15 kV. A minimum of 5 micrograph images are collected from randomly chosen locations across each sample, resulting in a total analyzed area of approximately 43.0 $mm^2$ across which the average pore diameter is estimated.

The SEM micrographs are then firstly processed using the image analysis toolbox in Matlab. Where required, the images are converted to gray scale. For a given image, a histogram of the intensity values of every single pixel is generated using the 'imhist' Matlab function. Typically, from such a histogram, two separate distributions are obvious, corresponding to pixels of the brighter sheet surface and pixels of the darker regions within the pores. A threshold value is chosen, corresponding to an intensity value between the peak value of these two distributions. All pixels having an intensity value lower than this threshold value are then set to an intensity value of 0, while pixels having an intensity value higher are set to 1, thus producing a binary black and white image. The binary image is then analyzed using ImageJ (https://imagej.nih.gov, version 1.52a), to examine both the pore area fraction and pore size distribution. The scale bar of each image is used to provide a pixel/mm scaling factor. For the analysis, the automatic thresholding and the analyze particles functions are used to isolate each pore. Output from the analyze function includes the area fraction for the overall image and the pore area and pore perimeter for each individual pore detected.

Average Pore Diameter is defined as $D_A50$: 50% of the total pore area is comprised of pores having equal or smaller hydraulic diameters than the $D_A50$ average diameter.

Hydraulic diameter='4*Pore area ($m^2$)/Pore perimeter (m)'.

It is an equivalent diameter calculated to account for the pores not all being circular.

Test 2: Micro-Computed Tomographic (μCT) Method for Determining Overall or Regional Average Pore Size and Average Cell Wall Thickness of the Open Cell Foams (OCF)

Porosity is the ratio between void-space to the total space occupied by the OCF. Porosity can be calculated from μCT scans by segmenting the void space via thresholding and determining the ratio of void voxels to total voxels. Similarly, solid volume fraction (SVF) is the ratio between solid-space to the total space, and SVF can be calculated as the ratio of occupied voxels to total voxels. Both Porosity and SVF are average scalar-values that do not provide structural information, such as, pore size distribution in the height-direction of the OCF, or the average cell wall thickness of OCF struts.

To characterize the 3D structure of the OCFs, samples are imaged using a μCT X-ray scanning instrument capable of acquiring a dataset at high isotropic spatial resolution. One example of suitable instrumentation is the SCANCO system model 50 μCT scanner (Scanco Medical AG, Brüttisellen, Switzerland) operated with the following settings: energy level of 45 kVp at 133 μA; 3000 projections; 15 mm field of view; 750 ms integration time; an averaging of 5; and a voxel size of 3 μm per pixel. After scanning and subsequent data reconstruction is complete, the scanner system creates a 16 bit data set, referred to as an ISQ file, where grey levels reflect changes in x-ray attenuation, which in turn relates to material density. The ISQ file is then converted to 8 bit using a scaling factor.

Scanned OCF samples are normally prepared by punching a core of approximately 14 mm in diameter. The OCF punch is laid flat on a low-attenuating foam and then mounted in a 15 mm diameter plastic cylindrical tube for scanning. Scans of the samples are acquired such that the entire volume of all the mounted cut sample is included in the dataset. From this larger dataset, a smaller sub-volume of the sample dataset is extracted from the total cross section of the scanned OCF, creating a 3D slab of data, where pores can be qualitatively assessed without edge/boundary effects.

To characterize pore-size distribution in the height-direction, and the strut-size, Local Thickness Map algorithm, or LTM, is implemented on the subvolume dataset. The LTM Method starts with a Euclidean Distance Mapping (EDM) which assigns grey level values equal to the distance each void voxel is from its nearest boundary. Based on the EDM data, the 3D void space representing pores (or the 3D solid space representing struts) is tessellated with spheres sized to match the EDM values. Voxels enclosed by the spheres are assigned the radius value of the largest sphere. In other words, each void voxel (or solid voxel for struts) is assigned the radial value of the largest sphere that that both fits within the void space boundary (or solid space boundary for struts) and includes the assigned voxel.

The 3D labelled sphere distribution output from the LTM data scan can be treated as a stack of two dimensional images in the height-direction (or Z-direction) and used to estimate the change in sphere diameter from slice to slice as a function of OCF depth. The strut thickness is treated as a 3D dataset and an average value can be assessed for the whole or parts of the subvolume. The calculations and measurements were done using AVIZO Lite (9.2.0) from ThermoFisher Scientific and MATLAB (R2017a) from Mathworks.

Test 3: Percent Open Cell Content of the Sheet Article

The Percent Open Cell Content is measured via gas pycnometry. Gas pycnometry is a common analytical technique that uses a gas displacement method to measure volume accurately. Inert gases, such as helium or nitrogen, are used as the displacement medium. A sample of the solid sheet article of the present invention is sealed in the instrument compartment of known volume, the appropriate inert gas is admitted, and then expanded into another precision internal volume. The pressure before and after expansion is measured and used to compute the sample article volume.

ASTM Standard Test Method D2856 provides a procedure for determining the percentage of open cells using an older model of an air comparison pycnometer. This device is no longer manufactured. However, one can determine the percentage of open cells conveniently and with precision by performing a test which uses Micromeritics' AccuPyc Pycnometer. The ASTM procedure D2856 describes 5 methods (A, B, C, D, and E) for determining the percent of open cells of foam materials. For these experiments, the samples can be analyzed using an Accupyc 1340 using nitrogen gas with the ASTM foampyc software. Method C of the ASTM procedure is to be used to calculate to percent open cells. This method simply compares the geometric volume as determined using calipers and standard volume calculations to the open cell volume as measured by the Accupyc, according to the following equation:

Open cell percentage=Open cell volume of sample/Geometric volume of sample*100

It is recommended that these measurements be conducted by Micromeretics Analytical Services, Inc. (One Micromeritics Dr, Suite 200, Norcross, GA 30093). More information on this technique is available on the Micromeretics Analytical Services web sites (www.particletesting.com or www.micromeritics.com), or published in "Analytical Methods in Fine particle Technology" by Clyde Orr and Paul Webb.

Test 4: Final Moisture Content of the Sheet Article

Final moisture content of the solid sheet article of the present invention is obtained by using a Mettler Toledo HX204 Moisture Analyzer (S/N B706673091). A minimum of 1 g of the dried sheet article is placed on the measuring tray. The standard program is then executed, with additional program settings of 10 minutes analysis time and a temperature of 110° C.

Test 5: Thickness of the Sheet Article

Thickness of the flexible, porous, dissolvable solid sheet article of the present invention is obtained by using a micrometer or thickness gage, such as the Mitutoyo Corporation Digital Disk Stand Micrometer Model Number IDS-1012E (Mitutoyo Corporation, 965 Corporate Blvd, Aurora, IL, USA 60504). The micrometer has a 1-inch diameter platen weighing about 32 grams, which measures thickness at an application pressure of about 0.09 psi (6.32 $gm/cm^2$).

The thickness of the flexible, porous, dissolvable solid sheet article is measured by raising the platen, placing a section of the sheet article on the stand beneath the platen, carefully lowering the platen to contact the sheet article, releasing the platen, and measuring the thickness of the sheet article in millimeters on the digital readout. The sheet article should be fully extended to all edges of the platen to make sure thickness is measured at the lowest possible surface pressure, except for the case of more rigid substrates which are not flat.

Test 6: Basis Weight of the Sheet Article

Basis Weight of the flexible, porous, dissolvable solid sheet article of the present invention is calculated as the weight of the sheet article per area thereof ($grams/m^2$). The area is calculated as the projected area onto a flat surface perpendicular to the outer edges of the sheet article. The solid sheet articles of the present invention are cut into sample squares of 10 cm×10 cm, so the area is known. Each of such sample squares is then weighed, and the resulting weight is then divided by the known area of 100 $cm^2$ to determine the corresponding basis weight.

For an article of an irregular shape, if it is a flat object, the area is thus computed based on the area enclosed within the outer perimeter of such object. For a spherical object, the area is thus computed based on the average diameter as $3.14\times(\text{diameter}/2)^2$. For a cylindrical object, the area is thus computed based on the average diameter and average length as diameter×length. For an irregularly shaped three-dimensional object, the area is computed based on the side with the largest outer dimensions projected onto a flat surface oriented perpendicularly to this side. This can be accomplished by carefully tracing the outer dimensions of the object onto a piece of graph paper with a pencil and then computing the area by approximate counting of the squares and multiplying by the known area of the squares or by taking a picture of the traced area (shaded-in for contrast) including a scale and using image analysis techniques.

Test 7: Density of the Sheet Article

Density of the flexible, porous, dissolvable solid sheet article of the present invention is determined by the equation: Calculated Density=Basis Weight of porous solid/(Porous Solid Thickness×1,000). The Basis Weight and Thickness of the dissolvable porous solid are determined in accordance with the methodologies described hereinabove.

Test 8: Specific Surface Area of the Sheet Article

The Specific Surface Area of the flexible, porous, dissolvable solid sheet article is measured via a gas adsorption technique. Surface Area is a measure of the exposed surface of a solid sample on the molecular scale. The BET (Brunauer, Emmet, and Teller) theory is the most popular model used to determine the surface area and is based upon gas adsorption isotherms. Gas Adsorption uses physical adsorption and capillary condensation to measure a gas adsorption isotherm. The technique is summarized by the following steps; a sample is placed in a sample tube and is heated under vacuum or flowing gas to remove contamination on the surface of the sample. The sample weight is obtained by subtracting the empty sample tube weight from the combined weight of the degassed sample and the sample tube. The sample tube is then placed on the analysis port and the analysis is started. The first step in the analysis process is to evacuate the sample tube, followed by a measurement of the free space volume in the sample tube using helium gas at liquid nitrogen temperatures. The sample is then evacuated a second time to remove the helium gas. The instrument then begins collecting the adsorption isotherm by dosing krypton gas at user specified intervals until the requested pressure measurements are achieved. Samples may then analyzed using an ASAP 2420 with krypton gas adsorption. It is recommended that these measurements be conducted by Micromeretics Analytical Services, Inc. (One Micromeritics Dr, Suite 200, Norcross, GA 30093). More information on this technique is available on the Micromeretics Analytical Services web sites (www.particletesting.com or www.micromeritics.com), or published in a book, "Analytical Methods in Fine particle Technology", by Clyde Orr and Paul Webb.

Test 9: Dissolution Rate

The dissolution rate of dissolvable sheets or solid articles of the present invention is measured as follows:

1. 400 ml of deionized water at room temperature (25° C.) is added to a 1 L beaker, and the beaker is then placed on a magnetic stirrer plate.
2. A magnetic stirrer bar having length 23 mm and thickness of 10 mm is placed in the water and set to rotate at 300 rpm.
3. A Mettler Toledo 5230 conductivity meter is calibrated to 1413 μS/cm and the probe placed in the beaker of water.
4. For each experiment, the number of samples is chosen such that a minimum of 0.2 g of sample is dissolved in the water.
5. The data recording function on the conductivity meter is started and the samples are dropped into the beaker. For 5 seconds a flat steel plate with diameter similar to that of the glass beaker is used to submerge the samples below the surface of the water and prevent them from floating to the surface.
6. The conductivity is recorded for at least 10 minutes, until a steady state value is reached.
7. In order to calculate the time required to reach 95% dissolution, a 10 second moving average is firstly calculated from the conductivity data. The time at which this moving average surpassed 95% of the final steady state conductivity value is then estimated and taken as the time required to achieve 95% dissolution.

EXAMPLES

Example 1: Exemplary Formulations of Flexible and Dissolvable Solid Sheets

Following are exemplary formulations of flexible and dissolvable solid sheets of the present invention, which exhibit satisfactory film-forming property, storage stability, and cleaning benefits:

TABLE A

| Ingredients (wt %) | A | B | C | D | E | F | G |
|---|---|---|---|---|---|---|---|
| Polyvinyl alcohol[1] | 21 | 18 | 21 | 15-25 | 15-25 | 15-25 | 15-25 |
| Polyvinyl alcohol[2] | — | 6 | — | — | — | — | — |
| Glycerin | 3 | 3.5 | 3 | 2-10 | 2-10 | 2-10 | 2-10 |
| $C_{12}$ LAS | 53 | 40 | — | 25-50 | 25-40 | 0-10 | 0-10 |
| $ST_2S$ | — | 0 | 53 | 0-10 | 0-10 | 40-60 | 25-40 |
| Sodium Laureth-3 Sulfate | 10 | 4.6 | 10 | 20-35 | 1-4 | 5-20 | 20-35 |
| $C_{12}$-$C_{14}$ Ethoxylated alcohol | 10 | 18 | 10 | 5-15 | 15-25 | 5-25 | 5-15 |
| Water | Balance | Balance | Balance | Balance | Balance | Balance | Balance |

[1]Homopolymer having a degree of polymerization of about 1700
[2]Homopolymer having a degree of polymerization of about 500

Example 2: Different OCF Structures in Solid Sheets Made by Different Heating/Drying Arrangements A wet pre-mixture with the following surfactant/polymer composition as described in Table 1 below is prepared.

TABLE 1

| Materials: | (Wet) w/w % | (Dry) w/w % |
|---|---|---|
| Polyvinyl alcohol (with a degree of polymerization of about 1700) | 7.58 | 21 |
| Glycerin | 1.08 | 3 |
| Linear Alkylbenzene Sulfonate | 19.12 | 53 |
| Sodium Laureth-3 Sulfate | 3.61 | 10 |
| C12-C14 Ethoxylated alcohol | 3.61 | 10 |
| Water | Balance | Balance |

Viscosity of the wet pre-mixture composition as described in Table 1 is about 14309.8 cps. After aeration, the average density of such aerated wet pre-mixture is about 0.225 $g/cm^3$.

A flexible, porous, dissolvable solid sheet A is prepared from the above wet pre-mixture described in Table 1 by using a continuous aerator (Aeros) and a rotary drum drier, with the following settings and conditions as described in Table 2 below:

TABLE 2

(DRUM DRYING)

| Parameters | Value |
|---|---|
| Wet pre-mixture temperature before and during aeration | 80° C. |
| Aeros feed pump speed setting | 600 |
| Aeros mixing head speed setting | 500 |
| Aeros air flow rate setting | 100 |
| Wet pre-mixture temperature before drying | 60° C. |
| Rotary drum drier surface temperature | 130° C. |
| Rotary drum drier rotational speed | 0.160 rpm |
| Drying time | 4.52 min |

Further, another flexible, porous, dissolvable solid sheet I is prepared from the above wet pre-mixture described in Table 1 by using a continuous aerator (Oakes) and a mold placed on an impingement oven, with the following settings and conditions as described in Table 3 below:

TABLE 3

(IMPINGEMENT OVEN DRYING)

| Parameters | Value |
|---|---|
| Wet pre-mixture temperature before and during aeration | 80° C. |
| Oakes air flow meter setting | 19.2 L/hour |
| Oakes pump meter speed setting | 20 rpm |
| Oakes mixing head speed | 1500 rpm |
| Mold depth | 1.0 mm |
| Impingement oven temperature | 130° C. |
| Drying time | 6 min |

Tables 4-7 as follows summarize various physical parameters and pore structures measured for the solid sheets A and I made from the above-described wet pre-mixture and respective drying processes.

TABLE 4

(PHYSICAL PARAMETERS)

| Sample | Drying Process | Average Basis Weight $g/m^2$ | Average Density $g/cm^3$ | Average Thickness mm | Specific Surface Area $m^2/g$ |
|---|---|---|---|---|---|
| A | Rotary Drum | 147.5 | 0.118 | 1.265 | 0.115 |
| I | Impingement Oven | 116.83 | 0.118 | 1.002 | — |

TABLE 5

(OVERALL PORE STRUCTURES)

| Sample | Drying Process | Percent Open Cell Content % | Overall Average Pore Size µm | Average Cell Wall Thickness µm |
|---|---|---|---|---|
| A | Rotary Drum | 90.75 | 467.1 | 54.3 |
| I | Impingement Oven | — | 197.6 | 15.2 |

TABLE 6

(SURFACE AND REGIONAL PORE STRUCTURES)

| Sample | Drying Process | Surface Average Pore Diameter (µm) Top | Average Pore Size (µm) Top | Middle | Bottom |
|---|---|---|---|---|---|
| A | Rotary Drum | 201.5 | 458.3 | 479.1 | 463.9 |
| Comp I | Impingement Oven | 53.3 | 139.9 | 213.1 | 238.7 |

TABLE 7

(VARIATIONS BETWEEN REGIONAL PORE STRUCTURES)

| Sample | Drying Process | Cross-Region Relative STD (%) | Btw-Region Ratios of Average Pore Sizes Bottom-to-Top | Bottom-to-Middle | Middle-to-Top |
|---|---|---|---|---|---|
| A | Rotary Drum | 2.31% | 1.012 | 0.968 | 1.046 |
| I | Impingement Oven | 25.99% | 1.706 | 1.120 | 1.523 |

The above data demonstrates that the solid sheet made by the rotary drum-drying process has an improved OCF structure characterized by a Top Surface Average Pore Diameters of greater than 100 µm, while the solid sheet made by the impingement oven drying process does not. This difference is further demonstrated by FIGS. 6A and 6B, which are SEM images of the top surface of the solid sheet A and that of the solid sheet I, respectively.

Further, the above data demonstrates that the solid sheet made by the rotary drum-drying process has significantly less regional variations in its Average Pore Sizes than the solid sheet made by the impingement oven drying process, especially with significantly smaller ratios of the bottom Average Pore Size over the top Average Pore Size.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A solid article, comprising:

i) from 40% to 70%, by weight of said solid article, of a first surfactant comprising $C_6$-$C_{20}$ linear alkylbenzene sulfonates (LAS);

ii) from 10% to 40%, by weight of said solid article, of a second surfactant comprising $C_6$-$C_{20}$ linear or branched alkylalkoxy sulfates (AAS) having a weight average degree of alkoxylation ranging from 0.5 to 10, and $C_6$-$C_{20}$ linear or branched alkylalkoxylated alcohols (AA) having a weight average degree of alkoxylation ranging from 5 to 15; and iii) from 10% to 30%, by weight of said solid article, of a polyvinyl alcohol having a weight average molecular weight of from 50,000 to 400,000 Daltons, wherein said solid article is in a form of a flexible and dissolvable sheet;

wherein said solid article has a bottom-to-top Average Pore Size ratio from 0.6 to 1.5; and wherein a Top Surface Average Pore Diameter of said solid article is greater than 100 μm.

2. The solid article of claim 1, which comprises from 40% to 65%, by weight of said solid article, of said first surfactant.

3. The solid article according to claim 1, which comprises no more than 15%, by weight of said solid article, of non-aromatic and unalkoxylated $C_6$-$C_{20}$ linear or branched alkyl sulfates (AS).

4. The solid article according to claim 1, wherein said polyvinyl alcohol has a weight average molecular weight ranging from 60,000 to 300,000 Daltons.

5. The solid article according to claim 1, which comprises no more than 20%, by weight of said solid article, of starch.

6. The solid article according to claim 1, which further comprises from 0.1% to 25%, of a plasticizer; wherein said plasticizer is selected from the group consisting of glycerin, ethylene glycol, polyethylene glycol, propylene glycol, and combinations thereof.

7. The flexible and dissolvable solid sheet article of claim 1, wherein said solid sheet article is porous and is characterized by:

a Percent Open Cell Content of from 80% to 100%; and/or an Overall Average Pore Size of from 100 μm to 2000 μm; and/or an Average Cell Wall Thickness of from 5 μm to 200 μm; and/or a final moisture content of from 0.5% to 25% by weight of said solid sheet article; and/or a thickness of from 0.5 mm to 4 mm; and/or a basis weight of from 50 grams/$m^2$ to 250 grams/$m^2$; and/or a density of from 0.05 grams/$cm^3$ to 0.5 grams/$cm^3$; and/or a Specific Surface Area of from 0.03 $m^2$/g to 0.25 $m^2$/g.

8. The solid article of claim 1, which comprises from 40% to 60%, by weight of said solid article, of said first surfactant.

9. The solid article of claim 2, which comprises from 10% to 30%, by weight of said solid article, of said second surfactant.

10. The solid article of claim 2, which comprises from 15% to 25%, by weight of said solid article, of said second surfactant.

11. The solid article according to claim 1, which comprises from 0% to 10%, by weight of said solid article, of non-aromatic and unalkoxylated $C_6$-$C_{20}$ linear or branched alkyl sulfates (AS).

12. The solid article according to claim 1, which comprises from 0% to 1%, by weight of said solid article, of non-aromatic and unalkoxylated $C_6$-$C_{20}$ linear or branched alkyl sulfates (AS).

13. The solid article according to claim 1, which comprises from 15% to 30%, by weight of said solid article, of said polyvinyl alcohol.

14. The solid article according to claim 1, wherein said polyvinyl alcohol has a weight average molecular weight ranging from 70,000 to 200,000 Daltons; and wherein said polyvinyl alcohol is characterized by a degree of hydrolysis ranging from 40% to 100%.

15. The solid article according to claim 1, which further comprises from 0.5% to 20% of a plasticizer; wherein said plasticizer is selected from the group consisting of glycerin, ethylene glycol, polyethylene glycol, propylene glycol, and combinations thereof.

16. The solid article of claim 15, wherein said plasticizer comprises glycerin.

* * * * *